US008404338B2

(12) United States Patent
Hein et al.

(10) Patent No.: US 8,404,338 B2
(45) Date of Patent: *Mar. 26, 2013

(54) X-RAY AND/OR METAL DETECTABLE ARTICLES AND METHOD OF MAKING THE SAME

(75) Inventors: Christopher Luke Hein, Evansville, IN (US); Jan-Pleun Lens, Rotterdam (NL); Vandita Pai-Paranjape, Evansville, IN (US); Constant Peek, Vianen (NL); Robert Dirk van de Grampel, Tholen (NL)

(73) Assignee: Sabic Innovative Plastics IP B.V. (NL)

( * ) Notice: Subject to any disclaimer, the term of this patent is extended or adjusted under 35 U.S.C. 154(b) by 565 days.

This patent is subject to a terminal disclaimer.

(21) Appl. No.: 12/570,421

(22) Filed: Sep. 30, 2009

(65) Prior Publication Data

US 2010/0124644 A1 May 20, 2010

Related U.S. Application Data

(63) Continuation-in-part of application No. 12/242,076, filed on Sep. 30, 2008.

(60) Provisional application No. 61/153,140, filed on Feb. 17, 2009.

(51) Int. Cl.
*B32B 5/16* (2006.01)
*B32B 27/28* (2006.01)
*G21F 1/10* (2006.01)
*B28B 1/00* (2006.01)

(52) U.S. Cl. ..... 428/220; 428/323; 428/329; 252/62.56; 252/62.59; 524/413; 264/165

(58) Field of Classification Search .......... None
See application file for complete search history.

(56) References Cited

U.S. PATENT DOCUMENTS

| 4,935,019 | A | 6/1990 | Papp, Jr. |
| 4,955,740 | A * | 9/1990 | Renz et al. ............... 403/27 |
| 5,183,614 | A | 2/1993 | Champion |
| 6,057,394 | A | 5/2000 | Bodiger et al. |
| 6,320,016 | B1 | 11/2001 | Bodiger et al. |
| 6,509,406 | B1 | 1/2003 | Brenner et al. |
| 6,585,755 | B2 | 7/2003 | Jackson et al. |
| 6,617,056 | B1 | 9/2003 | Hara et al. |
| 6,869,683 | B2 | 3/2005 | Sakurai et al. |
| 2003/0010929 | A1 | 1/2003 | Priewe et al. |
| 2004/0106703 | A1* | 6/2004 | Etzrodt et al. ............ 523/330 |

(Continued)

FOREIGN PATENT DOCUMENTS

| EP | 0524731 A1 | 6/1992 |
| JP | 2086650 | 3/1990 |

(Continued)

OTHER PUBLICATIONS

Wypych, G. "Handbook of Fillers". ChemTec Publishing, 2nd ed., (2000); pp. 241-303 and 395-484.*

(Continued)

*Primary Examiner* — Maria Veronica Ewald
*Assistant Examiner* — Prashant J Khatri
(74) *Attorney, Agent, or Firm* — Cantor Colburn LLP

(57) ABSTRACT

An article and thermoplastic composition including polycarbonate, a polysiloxane-polycarbonate and an x-ray detectable or metal detectable agent having good magnetic permeability and/or electrical conductivity wherein the composition may be used in articles for food preparation. The thermoplastic compositions are useful in forming molds for manufacturing a food product, such as chocolate molds.

25 Claims, 3 Drawing Sheets

70 KV with filter (A)

50 KV w/o filter (B)

U.S. PATENT DOCUMENTS

| | | | |
|---|---|---|---|
| 2006/0014919 A9 * | 1/2006 | Venderbosch et al. | 528/196 |
| 2006/0177379 A1 | 8/2006 | Asgari | |
| 2007/0048527 A1 | 3/2007 | Agarwal et al. | |
| 2007/0129492 A1 | 6/2007 | Colborn et al. | |
| 2007/0234525 A1 | 10/2007 | Laporte et al. | |

FOREIGN PATENT DOCUMENTS

| | | |
|---|---|---|
| WO | 9931172 | 6/1999 |
| WO | 0116225 | 3/2001 |
| WO | 2006069007 | 6/2006 |

OTHER PUBLICATIONS

ASTMD 1238-04, Standard Test Method for Melt Flow Rates of Thermoplastics by Extrusion Plastometer, published Dec. 2004, 14 pages.

ASTMD 2457, Standard Test Method for Specular Gloss of Plastic Films and Solid Plastics, published Oct. 2003, 5 pages.

ASTMD 256-04, Standard Test Methods for Determining the Izod Pendulum Impact Resistance of Plastics, published Jun. 2004, 20 pages.

ChemicalBook CAS Database List. "Triiron tetraoxide". Retrieved May 31, 2011.

International Search Report; International Application No. PCT/US2009/058977; International Filing Date Sep. 30, 2009; Date of Mailing Feb. 9, 2010; 3 Pages.

Written Opinion of the International Searching Authority; International Application No. PCT/US2009/058977; International Filing Date Sep. 30, 2009; Date of Mailing Feb. 9, 2010; 6 Pages.

* cited by examiner

70 KV with filter (A)　　50 KV w/o filter (B)

70 KV with filter (A)　　50 KV w/o filter (B)

US 8,404,338 B2

X-RAY AND/OR METAL DETECTABLE ARTICLES AND METHOD OF MAKING THE SAME

CROSS REFERENCE TO RELATED APPLICATIONS

The present application is a continuation-in-part of U.S. patent application Ser. No. 12/242,076 filed Sep. 30, 2008 and claims priority to U.S. Provisional Patent Application No. 61/153,140 filed Feb. 17, 2009, both of which are hereby incorporated by reference in their entirety.

BACKGROUND OF THE INVENTION

The present invention is directed to thermoplastic compositions having improved metal detectability, and in particular thermoplastic compositions including polycarbonate, a polysiloxane-polycarbonate polymer and an X-ray contrast agents or a metal detectable agent, methods of making and of improving x-ray and/or metal detectability in thermoplastics, and articles prepared therefrom.

Polycarbonate molds are commonly used in food production, such as chocolate molds. Such molds are generally made by plastic injection mold-making which involves high pressure injection of a polycarbonate resin around a metal master. Such polycarbonate molds have a long useful life and are very strong, and are desirable for both ease of use and for making high gloss chocolates. Other types of molds such as those made of silicone rubber or thermoformed plastic are also used for a limited set of applications.

Metal detectors are commonly used in the manufacturing process to detect metallic contaminants that typically arise from wear and tear of machines resulting from routine use, to ensure that food, such as chocolate, prepared from them are of the highest quality. However, metal detectors are not capable of detecting any contaminants coming from plastic components (such as a chocolate mold) in the manufacturing process. X-ray detectors can be used to detect plastics; however, polycarbonate and typical compositions, such as for example those useful for preparing chocolate molds, are transparent to X-rays. Elements having higher atomic numbers than carbon have to be introduced into polycarbonate, either in the form of additives (e.g., glass, pigments, etc.) or incorporated into the polymer chain, to enable articles prepared from the polycarbonate to show any level of X-ray contrast. Typically addition of glass or other inorganic fillers leads to loss of gloss and low transparency as well as reduction in flow and impact properties of polycarbonate. This is not acceptable in those matrices where low temperature ductility in combination with good flow is important.

BRIEF SUMMARY OF THE INVENTION

The above-described and other drawbacks are alleviated by, in an embodiment, an article comprising a thermoplastic composition comprising: a polysiloxane-polycarbonate; optionally, a polycarbonate; and an X-ray contrast agent comprising X-ray scattering atoms having an atomic number of greater than or equal to 22; wherein an article molded from the thermoplastic composition and having a thickness of 3.2 mm has a notched Izod impact (NII) strength of greater than or equal to about 620 J/m, when measured at a temperature of 0° C. according to ASTM D256-04, or a notched Izod impact strength of greater than or equal to about 409 J/m, when measured at a temperature of −30° C. according to ASTM D256-04, wherein an article molded from the thermoplastic composition and having a thickness of 3.2 mm has an Equivalent Al Thickness of greater than 0.51 mm, when irradiated with 50 kV X-ray radiation, and wherein for melt volume rates of the thermoplastic composition determined under a load of 1.2 kg at a temperature of 300° C. according to ASTM D1238-04, a melt volume rate measured at a dwell time of 18 minutes increases relative to a melt volume rate measured at a dwell time of 6 minutes by less than or equal to 31%.

In another embodiment, a thermoplastic composition comprises: 5 to 100 parts by weight of a polysiloxane-polycarbonate; 0 to 95 parts by weight of a polycarbonate; and 0.01 to 10 parts by weight of a contrast agent comprising rutile titanate having a median particle size of less than or equal to about 5 micrometers (m), magnetite having a median particle size of less than about 1 micrometer, or a combination comprising at least one of the foregoing contrast agents; wherein each of the polysiloxane-polycarbonate, polycarbonate, and X-ray contrast agent are present based on a combined 100 parts by weight of polysiloxane-polycarbonate and polycarbonate; wherein an article molded from the thermoplastic composition and having a thickness of 3 2 mm has a notched Izod impact (NII) strength of greater than or equal to about 620 J/m, when measured at a temperature of 0° C. according to ASTM D256-04, or a notched Izod impact strength of greater than or equal to about 409 J/m, when measured at a temperature of −30° C. according to ASTM D256-04, wherein an article molded from the thermoplastic composition and having a thickness of 3.2 mm has an Equivalent Al Thickness of greater than 0.51 mm, when irradiated with 50 kV X-ray radiation, and wherein for melt volume rates of the thermoplastic composition determined under a load of 1.2 kg at a temperature of 300° C. according to ASTM D1238-04, a melt volume rate measured at a dwell time of 18 minutes increases relative to a melt volume rate measured at a dwell time of 6 minutes by less than or equal to 31%.

In another embodiment, a method for increasing the x-ray contrast in an article comprises a thermoplastic composition, comprising combining an X-ray contrast agent having a median particle size of less than or equal to 5 micrometers, with a polysiloxane-polycarbonate, and optionally a polycarbonate, wherein the X-ray contrast agent comprises an element having an atomic number of greater than or equal to 22; and forming the article from the thermoplastic composition, wherein an article molded from the thermoplastic composition and having a thickness of 3.2 mm has a notched Izod impact (NII) strength of greater than or equal to about 620 J/m, when measured at a temperature of 0° C. according to ASTM D256-04, or a notched Izod impact strength of greater than or equal to about 409 J/m, when measured at a temperature of −30° C. according to ASTM D256-04, wherein an article molded from the thermoplastic composition and having a thickness of 3.2 mm has an Equivalent Al Thickness of greater than 0.51 mm, when irradiated with 50 kV X-ray radiation, and wherein for melt volume rates of the thermoplastic composition determined under a load of 1.2 kg at a temperature of 300° C. according to ASTM D1238-04, a melt volume rate measured at a dwell time of 18 minutes increases relative to a melt volume rate measured at a dwell time of 6 minutes by less than or equal to 31%.

In another embodiment, a mold for manufacturing chocolate comprises a thermoplastic composition comprising: 5 to 99 parts by weight of a polysiloxane-polycarbonate, 1 to 95 parts by weight of a polycarbonate, and 0.01 to 10 parts by weight of an X-ray contrast agent comprising rutile titanate having a median particle size of less than or equal to about 5 micrometers, magnetite having a median particle size of less than or equal to about 0.5 micrometers, or a combination comprising at least one of the foregoing X-ray contrast agents, wherein each of the polysiloxane-polycarbonate, polycarbonate, and X-ray contrast agent are present based on a combined 100 parts by weight of polysiloxane-polycarbonate and polycarbonate, wherein an article molded from the thermoplastic composition and having a thickness of 3.2 mm has a notched Izod impact (NII) strength of greater than or equal to about 620 J/m, when measured at a temperature of 0° C. according to ASTM D256-04, or a notched Izod impact strength of greater than or equal to about 409 J/m, when measured at a temperature of −30° C. according to ASTM D256-04, wherein an article molded from the thermoplastic composition and having a thickness of 3.2 mm has an Equivalent Al Thickness of greater than 0.51 mm, when irradiated with 50 kV X-ray radiation, and wherein for melt volume rates of the thermoplastic composition determined under a load of 1.2 kg at a temperature of 300° C. according to ASTM D1238-04, a melt volume rate measured at a dwell time of 18 minutes increases relative to a melt volume rate measured at a dwell time of 6 minutes by less than or equal to 31%.

Alternatively, the above-described and other drawbacks are alleviated by, in an embodiment, an article including a thermoplastic composition including: polycarbonate, a polysiloxane-polycarbonate and a metal detectable agent having good magnetic permeability and/or electrical conductivity; wherein an article molded from the thermoplastic composition and having a thickness of 3.2 mm has a notched Izod impact (NII) strength of greater than or equal to 300 J/m, when measured at a temperature of 23° C. according to ASTM D256-04, or a notched Izod impact strength of greater than or equal to 150 J/m, when measured at a temperature of 0° C. according to ASTM D256-04. The thermoplastic compositions are useful in forming molds for manufacturing a food product, such as chocolate molds.

Accordingly, in one embodiment, the present invention provides a thermoplastic composition that includes 65 to 95 parts by weight of polycarbonate, 5 to 35 parts by weight of a polysiloxane-polycarbonate and 0.01 to 10 parts by weight of a metal detectable agent; wherein an article molded from the thermoplastic composition and having a thickness of 3.2 mm has a notched Izod impact (NII) strength of greater than or equal to 200 J/m, when measured at a temperature of 23° C. according to ASTM D256-04, or a notched Izod impact strength of greater than or equal to 125 J/m, when measured at a temperature of 0° C. according to ASTM D256-04.

In another embodiment, the present invention provides method for increasing the metal detectability in an article including a thermoplastic composition, and including the steps of combining a metal detectable agent with polycarbonate and a polysiloxane-polycarbonate, wherein the metal detectable agent is selected from a ferrous metal or a nonferrous metal, and forming the article from the thermoplastic composition; wherein an article molded from the thermoplastic composition and having a thickness of 3.2 mm has a notched Izod impact (NII) strength of greater than or equal to 200 J/m, when measured at a temperature of 23° C. according to ASTM D256-04, or a notched Izod impact strength of greater than or equal to 125 J/m, when measured at a temperature of 0° C. according to ASTM D256-04.

In yet another embodiment, the present invention provides a mold for manufacturing a food product that includes a thermoplastic composition having 65 to 95 parts by weight of polycarbonate, 5 to 35 parts by weight of a polysiloxane-polycarbonate and 0.01 to 10 parts by weight of a metal detectable agent; wherein an article molded from the thermoplastic composition and having a thickness of 3.2 mm has a notched Izod impact (NII) strength of greater than or equal to 200 J/m, when measured at a temperature of 23° C. according to ASTM D256-04, or a notched Izod impact strength of greater than or equal to 125 J/m, when measured at a temperature of 0° C. according to ASTM D256-04.

A description of the figures, which are meant to be exemplary and not limiting, is provided below.

Figure 1:
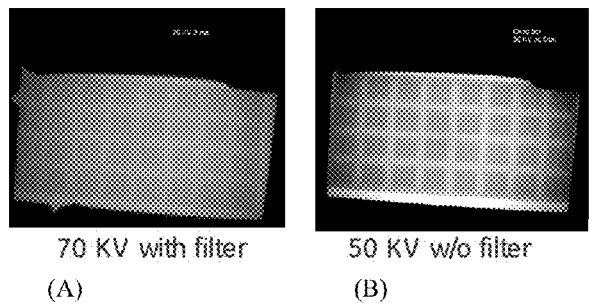
FIG. 1 is an X-ray image of a chocolate bar taken at (A) 70 kV using a filter, and (B) 50 kV taken without a filter.

The above described and other features are exemplified by the following detailed description.

DETAILED DESCRIPTION OF THE INVENTION

This disclosure provides a thermoplastic composition that is detectable by an x-ray detector or a metal detector and is prepared from polycarbonate, a polysiloxane-polycarbonate copolymer and an x-ray contrast agent or a metal detectable agent. Articles made from the thermoplastic composition are also disclosed.

It has been found that certain compounds are useful as metal detectable agents for formulating the metal detectable thermoplastic composition. Specifically useful compounds include ferrous metals and nonferrous metals, such as magnetite, selected from within an optimal particle size range. These compounds are useful in formulating such metal detectable compositions having the aforementioned properties. Common inorganic compounds useful as metal detectable agents are selected from ferrous metals (having both good magnetic permeability and electrical conductivity) and nonferrous metals (which have poor magnetic permeability but good electrical conductivity). The particle size of the metal detectable agent is selected such that select properties (flow, low temperature impact, gloss) of the composition are maintained.

The thermoplastic compositions used in the present invention include both a polycarbonate and a polysiloxane-polycarbonate copolymer, also referred to as a polysiloxane-polycarbonate. As used herein, the terms "polycarbonate" and "polycarbonate resin" mean compositions having repeating structural carbonate units of the formula (1):

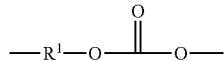

(1)

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$-A^1-Y^1-A^2- \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the reaction of dihydroxy compounds having the formula HO—$R^1$—OH, which includes dihydroxy compounds of formula (3):

$$HO-A^1-Y^1-A^2-OH \quad (3)$$

wherein $Y^1$, $A^1$ and $A^2$ are as described above. Also included are bisphenol compounds of general formula (4):

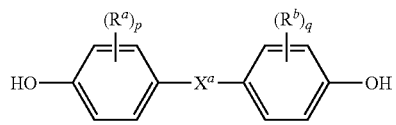

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

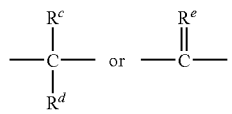

(5)

wherein $R^c$ and $R^d$ each independently represent a hydrogen atom or a monovalent linear or cyclic hydrocarbon group and $R^e$ is a divalent hydrocarbon group.

In an embodiment, a heteroatom-containing cyclic alkylidene group includes at least one heteroatom with a valency of 2 or greater, and at least two carbon atoms. Heteroatoms for use in the heteroatom-containing cyclic alkylidene group include —O—, —S—, and —N(Z)— where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

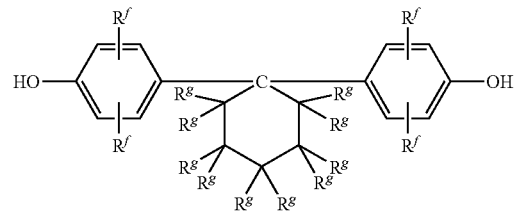

(6)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination including at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1- dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations including at least one of the foregoing dihydroxy compounds.

Specific examples of bisphenol compounds that may be represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations including at least one of the foregoing dihydroxy compounds may also be used.

In a specific embodiment, the polycarbonate may be a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate may have a melt volume flow rate (often abbreviated MVR) measures the rate of extrusion of a thermoplastics through an orifice at a prescribed temperature and load. Polycarbonates useful for the formation of articles may have an MVR, measured at 300° C. under a load of 1.2 kg according to ASTM D1238-04 or ISO 1133, of 0.5 to 80 cubic centimeters per 10 minutes (cc/10 min). In a specific embodiment, a useful polycarbonate or combination of polycarbonates (i.e., a polycarbonate composition) has an MVR measured at 300° C. under a load of 1.2 kg according to ASTM D1238-04 or ISO 1133, of 0.5 to 20 cc/10 min, specifically 0.5 to 18 cc/10 min, and more specifically 1 to 15 cc/10 min.

"Polycarbonates" and "polycarbonate resins" as used herein further include homopolycarbonates, copolymers including different $R^1$ moieties in the carbonate (referred to herein as "copolycarbonates"), copolymers including carbonate units and other types of polymer units, such as ester units, polysiloxane units, and combinations including at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), repeating units of formula (8):

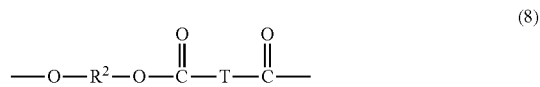

wherein $R^2$ is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

In an embodiment, $R^2$ is a $C_{2-30}$ alkylene group having a straight chain, branched chain, or cyclic (including polycyclic) structure. In another embodiment, $R^2$ is derived from an aromatic dihydroxy compound of formula (4) above. In another embodiment, $R^2$ is derived from an aromatic dihydroxy compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations including at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid includes a combination of isophthalic acid and terephthalic acid wherein the weight ratio of isophthalic acid to terephthalic acid is 91:9 to 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers may vary broadly, for example 1:99 to 99:1, specifically 10:90 to 90:10, more specifically 25:75 to 75:25, depending on the selected properties of the final composition.

Processes such as interfacial polymerization and melt polymerization can be used manufacture polycarbonates. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations including at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X^-$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be 0.1 to 10 wt % based on the weight of bisphenol in the phosgenation mixture. In another embodiment an effective amount of phase transfer catalyst may be 0.5 to 2 wt % based on the weight of bisphenol in the phosgenation mixture.

All types of polycarbonate end groups are contemplated as being useful in the polycarbonate composition, provided that such end groups do not significantly adversely affect selected properties of the compositions.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of 0.05 to 2.0 wt %. Mixtures including linear polycarbonates and branched polycarbonates may be used.

A chain stopper (also referred to as a capping agent) may be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p-and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a BANBURY® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination including at least one of the foregoing. In addition, transesterification catalysts for use may include phase transfer catalysts of formula $(R^3)_4Q^+X$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination including at least one of the foregoing.

In addition to the polycarbonates described above, combinations of the polycarbonate with other thermoplastic polymers, for example combinations of homopolycarbonates and/or polycarbonate copolymers with polyesters, may be used. Useful polyesters may include, for example, polyesters having repeating units of formula (8), which include poly(alkylene dicarboxylates), liquid crystalline polyesters, and polyester copolymers. The polyesters described herein are generally completely miscible with the polycarbonates when blended.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

The polyester-polycarbonates may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or a combination comprising at least one of the foregoing, it is possible to employ isophthaloyl dichloride, terephthaloyl dichloride, and a combination comprising at least one of the foregoing.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Useful polyesters may include aromatic polyesters, poly(alkylene esters) including poly(alkylene arylates), and poly(cycloalkylene diesters). Aromatic polyesters may have a polyester structure according to formula (8), wherein D and T are each aromatic groups as described hereinabove. In an embodiment, useful aromatic polyesters may include, for example, poly(isophthalate-terephthalate-resorcinol)esters, poly(isophthalate-terephthalate-bisphenol-A)esters, poly[(isophthalate-terephthalate-resorcinol)ester-co-(isophthalate-terephthalate-bisphenol-A)]ester, or a combination comprising at least one of these. Also contemplated are aromatic polyesters with a minor amount, e.g., about 0.5 to about 10 wt %, based on the total weight of the polyester, of units derived from an aliphatic diacid and/or an aliphatic polyol to make copolyesters. Poly(alkylene arylates) may have a polyester structure according to formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations comprising at least one of the foregoing polyesters may also be used.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (9):

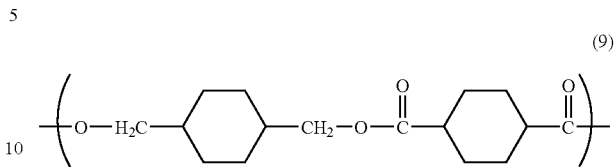

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The polycarbonate and polyester and/or polyester-polycarbonate may be used in a weight ratio of 1:99 to 99:1, specifically 10:90 to 90:10, and more specifically 30:70 to 70:30, depending on the function and properties desired.

The polyester-polycarbonates may have a weight average molecular weight ($M_w$) of 1,500 to 100,000 g/mol, specifically 1,700 to 50,000 g/mol, more specifically 2,000 to 40,000 g/mol, and still more specifically 5,000 to 30,000 g/mol. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Where used, it is desirable for a polyester-polycarbonate to have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04. Commercial polyester blends with polycarbonate are marketed under the trade name XYLEX®, including for example XYLEX® X7300, and commercial polyester-polycarbonates are marketed under the tradename LEXAN™ SLX polymers, including for example LEXAN™ SLX-9000, and are available from SABIC Innovative Plastics (formerly GE Plastics).

In an embodiment, the thermoplastic composition includes polycarbonate in an amount of 0 to 95 parts by weight, specifically 1 to 95 parts by weight, based on a combined 100 parts by weight of polysiloxane-polycarbonate and polycarbonate. In a specific embodiment, the thermoplastic composition includes polycarbonate in an amount of 1 to 50 parts by weight, specifically 1 to 45 parts by weight, more specifically 5 to 40 parts by weight, and still more specifically 10 to 35 parts by weight, based on a combined 100 parts by weight of polysiloxane-polycarbonate and polycarbonate. In another specific embodiment, the thermoplastic composition includes polycarbonate in an amount of 70 to 95 parts by weight, specifically 75 to 95 parts by weight, more specifically 80 to 95 parts by weight, based on a combined 100 parts by weight of polysiloxane-polycarbonate and polycarbonate.

In addition to the polycarbonate, the thermoplastic compositions used in the present invention include a polysiloxane-polycarbonate copolymer that also includes a polycarbonate with a polysiloxane. The polysiloxane (also referred to herein as "polydiorganosiloxane") blocks of the copolymer include repeating siloxane units (also referred to herein as "diorganosiloxane units") of formula (10):

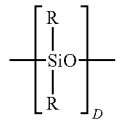
(10)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (10) may vary widely depending on the type and relative amount of each component in the thermoplastic composition, the selected properties of the composition, and like considerations. Generally, D may have an average value of 2 to 1,000, specifically 2 to 500, more specifically 5 to 100, and still more specifically 5 to 50. In a specific embodiment, D has an average value of 40 to 50. In an exemplary embodiment, D has an average value of 45. In another specific embodiment, D has an average value of 20 to 40. In another exemplary embodiment, D has an average value of 30.

Where D is of a lower value, e.g., less than 40, it may be beneficial to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (11):

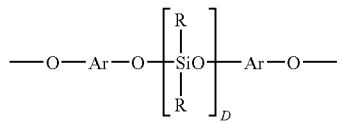
(11)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Useful Ar groups in formula (11) may be derived from a $C_6$-$C_{30}$ dihydroxyarylene compound, for example a dihydroxyarylene compound of formula (3), (4), or (7) above. Combinations including at least one of the foregoing dihydroxyarylene compounds may also be used. Specific examples of dihydroxyarylene compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations including at least one of the foregoing dihydroxy compounds may also be used.

Units of formula (11) may be derived from the corresponding dihydroxy compound of formula (12):

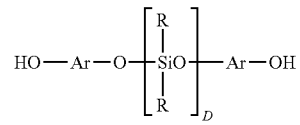
(12)

wherein R, Ar, and D are as described above. Compounds of formula (12) may be obtained by the reaction of a dihydroxyarylene compound with, for example, an alpha, omega-bisacetoxypolydiorangonosiloxane under phase transfer conditions.

In another embodiment, polydiorganosiloxane blocks include units of formula (13):

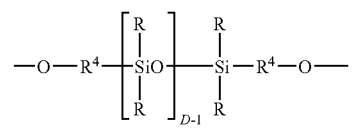
(13)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (14):

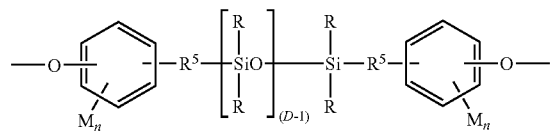
(14)

wherein R and D are as defined above. Each $R^5$ in formula (14) is independently a divalent $C_2$-$C_8$ aliphatic group. Each M in formula (13) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (14) may be derived from the corresponding dihydroxy polydiorganosiloxane (15):

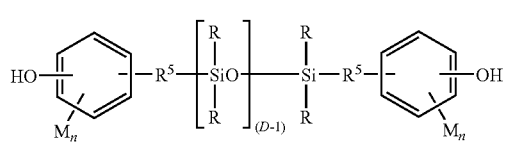
(15)

wherein R, D, M, $R^5$, and n are as described above. Such dihydroxy polysiloxanes can be made by effecting a platinum catalyzed addition between a siloxane hydride of formula (16):

(16)

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures including at least one of the foregoing may also be used.

The polysiloxane-polycarbonate includes 50 to 99.9 wt % of carbonate units and 0.1 to 50 wt % siloxane units, specifically 0.1 to 25 wt % siloxane units, based on the total weight of the polysiloxane-polycarbonate. In a specific embodiment, the polysiloxane-polycarbonate copolymer includes 90 to 99 wt %, more specifically 92 to 98 wt %, still more specifically 93 to 97 wt %, and still more specifically 93 to 96 wt % of carbonate units and 1 to 10 wt %, specifically 2 to 8 wt %, more specifically 3 to 7 wt %, and still more specifically 4 to 7 wt % siloxane units. In an exemplary embodiment the polysiloxane-polycarbonate includes about 6 wt % siloxane units. In another specific embodiment, the polysiloxane-polycarbonate copolymer includes 75 to 90 wt %, more specifically 75 to 85 wt %, still more specifically 77 to 83 wt %, and still more specifically 78 to 82 wt % of carbonate units and 10 to 25 wt %, specifically 15 to 25 wt %, more specifically 17 to 23 wt %, and still more specifically 18 to 22 wt % siloxane units. In another exemplary embodiment the polysiloxane-polycarbonate includes about 20 wt % siloxane units. All references to weight percent compositions in the polysiloxane-polycarbonate are based on the total weight of the polysiloxane-polycarbonate.

In an embodiment, the polysiloxane-polycarbonate includes polysiloxane units, and carbonate units derived from bisphenol A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000 g/mol, specifically 5,000 to 50,000 g/mol as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C. under a load of 1.2 kg, of 1 to 50 cubic centimeters per 10 minutes (cc/10 min), specifically 2 to 30 cc/10 min. Mixtures of polysiloxane-polycarbonates of different flow properties may be used to achieve the overall selected flow property. In an embodiment, exemplary polysiloxane-polycarbonates are marketed under the trade name LEXAN™ EXL polycarbonates, available from SABIC Innovative Plastics (formerly GE Plastics).

In an embodiment, the thermoplastic composition includes polysiloxane-polycarbonate in an amount of 5 to 100 parts by weight, specifically 5 to 99 parts by weight, based on combined 100 parts by weight of polysiloxane-polycarbonate and any added polycarbonate. In a specific embodiment, the thermoplastic composition includes polysiloxane-polycarbonate in an amount of 50 to 99 parts by weight, specifically 55 to 99 parts by weight, more specifically 60 to 95 parts by weight, and still more specifically 65 to 90 parts by weight, based on combined 100 parts by weight of polysiloxane-polycarbonate and any added polycarbonate. In another specific embodiment, the thermoplastic composition includes polysiloxane-polycarbonate in an amount of 5 to 30 parts by weight, specifically 5 to 25 parts by weight, and more specifically 5 to 20 parts by weight, based on a combined 100 parts by weight of polysiloxane-polycarbonate and any added polycarbonate.

In select embodiments, the thermoplastic composition also includes an X-ray contrast agent. The X-ray contrast agent can be an inorganic compound comprising atoms with an atomic number sufficient to scatter incident X-ray radiation, also referred to herein as X-ray scattering atoms. In an embodiment, the X-ray contrast agent comprises X-ray scattering atoms having an atomic number of greater than or equal to 22, specifically greater than or equal to 24, more specifically greater than or equal to 26, and still more specifically greater than or equal to 28. Also in an embodiment, the X-ray contrast agent includes the X-ray scattering atoms in an amount greater than or equal to about 1 percent by weight, more specifically greater than or equal to about 5 percent by weight, and still more specifically greater than or equal to about 10 percent by weight, based on the total weight of the X-ray contrast agent.

The X-ray contrast agent is, in one embodiment, in the form of particles, and may, depending upon the type used, be a filler, pigment, or other such class of inorganic material having suitable properties as defined herein. The particles as disclosed herein can be used in any suitable morphological form, including but not limited to microparticles, nanoparticles, and particles having various shapes including spheres, rods, faceted crystalline shapes, irregular shapes, and the like. The size of the particles of the X-ray contrast agent, as measured by the longest dimension and also referred to as both particle size and particle size, can be described more generally using the median of the distribution of the particle sizes, also referred to as the median particle size. Particle sizes can be determined using various methods, typically light scattering methods including static light scattering (SLS) and dynamic light scattering (DLS), also referred to generally as laser light scattering techniques. Particles of X-ray contrast agent as disclosed herein have a median particle size ($D_{50}$), of less than or equal to about 5 micrometers, specifically less than or equal to 2 micrometers, more specifically less than or equal to 1.5 micrometers, and still more specifically less than or equal to about 1 micrometer. In a specific embodiment, useful X-ray contrast agents have a median particle size about 0.1 to about 0.5 micrometers, specifically about 0.2 to about 0.5 micrometers. In another specific embodiment, useful X-ray contrast agents have a median particle size about 0.5 to about 1 micrometers, specifically about 0.5 to about 0.9 micrometers. The maximum particle size range (D90, where 90% of the particles are smaller) for X-ray contrast agents varies with the median particle size, and can in general be about 0.5 to about 30 micrometers, specifically about 1 to about 25 micrometers, wherein particles having the maximum particle size constitute less than 5 wt %, specifically less than 3 wt %, of the total weight of particles of X-ray contrast agent. The distribution of median particle sizes of an X-ray contrast agent can be unimodal, bimodal, or multimodal.

X-ray contrast agents can be used in varying stages of compositional purity, provided any impurities present in the thermoplastic composition do not significantly adversely affect the desired properties of the thermoplastic composition. Where desired, X-ray contrast agents can have minor amounts of impurities of less than or equal to about 0.1% by weight, more specifically less than or equal to about 0.01% by weight, and still more specifically less than or equal to about 0.001% by weight, based on the total weight of the X-ray contrast agent. In one embodiment, the X-ray contrast agent can contain minor amounts of impurities present as the oxide, hydroxide, carboxylate, carbonate, subcarbonates, phosphate, sulfate, sulfonate, silicate, aluminate, or other salt of metals and/or nonmetals such as lithium, sodium, potassium, magnesium, calcium, barium, silicon, iron, zinc, nickel, copper, boron, aluminum, combinations of these, and the like, in minor amounts so that the desired properties of the thermoplastic composition are not significantly adversely affected. In another embodiment, the X-ray contrast agent may be treated or purified to remove or reduce the presence of such impurities, where such impurities are initially present (prior to treating or purification) in the X-ray contrast agent in amounts sufficient to significantly adversely affect the desirable properties of the composition. The X-ray contrast agents disclosed herein do not require separation or purification of phases to provide a suitable material.

The X-ray contrast agents as used can be untreated, or used as treated, coated, and/or dispersed forms. Any suitable surface coating agent, treatment, or dispersant can be used that is suitable to adjust as desired the dispersing properties, adhesion properties, or other such properties of the X-ray contrast agent particles used herein. In addition, it is contemplated that the X-ray contrast agent can be in a single structured particle, or as a core-shell structured particle, with the core and shell layers having different phases or compositions. Any such structure is contemplated, provided the inclusion of the structured particle does not have any significantly adverse effects on the properties of the thermoplastic composition.

X ray contrast agents as disclosed hereinabove include inorganic, have sufficient X-ray contrast, and do not significantly adversely affect the properties of a thermoplastic composition prepared therewith. Useful pigments include, for example, inorganic pigments. Exemplary inorganic pigments include metal oxide hydroxides and metal oxides such as zinc oxide, titanium dioxides, iron oxides, chromium oxides, cerium oxide, colored alumina oxide particles, or the like. Inorganic pigments can include carbonates, and titanates based on rutile, spinels, priderite, and pseudobrookite pigment structures. As used herein "rutile" is a mineral composed primarily of titanium dioxide ($TiO_2$) and is the most common natural form of $TiO_2$, along with its two less abundant polymorphs anatase (having a tetragonal, pseudo-octahedral morphology), and brookite, an orthorhombic mineral. Rutile is a desirable polymorph of $TiO_2$ because it has the lowest molecular volume of the three polymorphs of $TiO_2$ (i.e., rutile, brookite, anatase), hence the highest density. Rutile has among the highest refractive indices of any known mineral. Also as used herein, "spinels" generally are any of a class of minerals of general formulation $XY_2O_4$ (where X and Y are each metal cations) which crystallize in the cubic (isometric) crystal system, with the oxide anions arranged in a cubic close-packed lattice and the cations X and Y occupying some or all of the octahedral and tetrahedral sites in the lattice, where X and Y can be divalent, trivalent, or quadrivalent cations. Typical X and Y metal cations may include, but are not limited to, magnesium, zinc, iron, manganese, aluminum, chromium, titanium, and silicon. The anion in a spinel is typically oxide. Spinels may be normal spinels, in which X cations occupy the tetrahedral sites of the oxide lattice, and Y cations occupy the octahedral sites; or inverse spinels in which half the Y cations occupy the tetrahedral sites, and both X and Y cations occupy the octahedral sites. Inverse spinels can thus have twice as many filled octahedra as tetrahedra.

Inorganic pigments can include carbonates such as calcium and cobalt carbonate, titanates based on rutile such as chromium antimony titanate and nickel antimony titanate, spinels such as cobalt and iron titanates, priderite, and pseudobrookite pigment structures. Examples of metal ions that may be contained within the rutile lattice include tungsten, cobalt, lithium, cerium, manganese, niobium, barium, tin, and zinc, but they are not limited to these metal ions. Other exemplary pigments include: chromites such as copper chromite black and cobalt chromite green; ferrites such as the pure ferrite spinels that contain magnesium and zinc, mixed chromite/ferrite spinels, and mixed chromium iron pigments identified as Pigment Green 17 or Pigment Brown 29; sulfides and sulfates such as cadmium sulfides and sulfoselenides, cerium sulfides, zinc sulfide, barium sulfate, and strontium sulfate; chromates; silicates such as ultramarine and zirconium silicate and zircon praseodymium yellow pigments; cyanide complexes such as the Fe(II)-Fe(III) cyano complexes (e.g., "Prussian blue"); calcium, lanthanum, and tantalum oxide-nitrides and titanium nitride; manganese and cobalt phosphates; titania-rare earth mixed oxide pigments; luminescent pigments such as sulfides and sulfoselenides, alkaline-earth sulfides and sulfoselenides, oxysulfides, borates, aluminates, gallates, silicates, germinates, halophosphates and phosphates, oxides, arsenates, and vanadates including yttrium vanadates, niobates and tantalates, sulfates, tungstates and molybdates.

Other inorganic compounds that may be used as X-ray contrast agents include alkali-metal halides, alkaline-earth halides, including anti-stokes shift pigments, and oxyhalides; quantum effect pigments such as nanoscale silicon with a particle size less than 5 nanometers; semi-conducting luminescent nanoparticles such as $Cd_3P_2$, and PbS; and storage phosphors such as CaS:Eu,Sm. Phosphorescent materials ("phosphors") may also be used. Such phosphors include ZnS:Cu and SrS:Bi. Phosphors that can be used include those based on $MAl_2O_4$ wherein M is a metal such as calcium, strontium, barium, or a combination comprising at least one of the foregoing metals. The matrix can be doped with europium and dysprosium.

Other pigments and dyes may be used as X-ray contrast agents, including azo lakes (calcium lakes), lanthanide chelates, metal dithiol complexes, phthalocyanines, metalloporphyrin dyes, and 1,1'-diethyl-2,2'-carbocyanine iodide. Other colorants that can be used include mica, iron mica, metal oxide mica, antimony trioxide, angular metameric pigment, cholesteric liquid crystal, metal oxide coated glass, metal flake, or a combination comprising at least one of the foregoing materials. In one embodiment, the pigment or color additive is a metal flake having a largest diameter of 17.5 to 650 micrometers. The metal flake can comprise aluminum, bronze, brass, chromium, copper, gold, an alloy comprising a least one of the foregoing materials, or a combination comprising at least one of the foregoing materials. Colorants also include materials with magnetic properties e.g., magnetic pigments such as chromium dioxide, iron oxides, and cobalt-containing iron oxides. A combination comprising one or more of any of the foregoing different types of additives can be used.

Specific inorganic compounds that are useful as X-ray contrast agents include magnetite and rutile titanate. In one embodiment, the X-ray contrast agent can comprise magnetite, also referred to ferrous-ferric oxide. Magnetite is a ferrimagnetic mineral of chemical formula $Fe_3O_4$, which can also be written as $FeO.Fe_2O_3$, comprising one molar equivalent of wustite (FeO, an iron (II) compound) and one molar equivalent of hematite ($Fe_2O_3$, an iron (III) compound). Magnetite may be obtained as a mineral, or as a synthetic product prepared by, for example, an aqueous solution method. In addition to comprising Fe(II) and Fe(III) oxides, magnetites may further include small amounts i.e., less than about 5% by weight in total, of other elements such as for example, phosphorus, silicon, and/or aluminum, where inclusion of one or more of these may influence the particle shape for synthetic magnetites. Particles of magnetite may thus be hexahedral, octahedral, twinned, or spherical in structure. Magnetite has an inverse spinel structure. In a specific embodiment, where magnetite is used, the median particle size of the magnetite is less than about 1 micrometer. In a more specific embodiment, the median particle size of magnetite is 0.01 to about 0.5 micrometers, specifically about 0.1 to about 0.5 micrometers, and still more specifically about 0.2 to about 0.5 micrometers.

In another embodiment, the X-ray contrast agent can comprise a rutile titanate. Rutile titanates, also referred to as rutile titanate pigments, are pigments that include a rutile (titanium dioxide, $TiO_2$) crystal structure and at least two metal oxides. Typically, rutile titanate pigments obtain color by incorporating a color-producing transition metal ion into the rutile crystal structure of the host oxide, e.g., titanium dioxide (rutile). Additionally, the rutile titanates can include metals, such as antimony, tungsten, or niobium. Rutile titanates are chemically neutral, which is desirable to minimize decomposition where such a pigment is to be included in a polycarbonate-based matrix. Exemplary rutile titanates include Pigment Yellow 53 pigment (nickel antimony rutile titanate pigment), Pigment Yellow 163 (chromium tungsten rutile titanate orange), and Pigment Brown 24 (chromium antimony rutile titanate yellow). Combinations comprising at least one of the foregoing rutile titanates may be used.

Rutile titanates may be manufactured by any suitable means known in the art. For example, rutile titanates may be prepared by a calcination process, which firstly involves intimately mixing transition metal compounds (including nickel compounds such as nickel oxide and nickel carbonate, tantalum compounds, antimony oxide, chromium oxides, manganese oxides, iron oxides, cobalt oxides, mixtures thereof, or the like) with a titanium compound and any other compound (compounds of antimony, tungsten, or other additive compounds) together in either a wet or dry state in appropriate proportions to form a mixed metal oxide. The titanium compound used can be, for example, titanium dioxide, titanium oxide hydrate, titanium oxide hydroxide, titanyl sulfate, synthetic anatase, ultra-fine rutile or a rutile pigment. As natural rutile may contain up to 10% by weight of iron and significant amounts of niobium and tantalum, conventional rutile titanate manufacturing processes may use synthetic titanium dioxide, prepared by a chloride or sulfate process. Additionally, a chemical compound including a metal cation such as $W^{6+}$, $Mo^{6+}$, $Nb^{5+}$, or $Ta^{5+}$, or mixtures thereof can be combined with the rutile ore and the transition metal oxide. The mixed metal oxide so formed is secondly calcined at high temperature in a kiln or furnace. For example, nickel titanate yellow may be made by mixing an active grade of nickel carbonate with a finely powdered active grade of antimony oxide and an active grade of titanium dioxide, and calcining at up to about 1,000° C. until the mixture is fully reacted, to form a nickel-antimony titanate.

The thermoplastic composition may also include mixtures of X-ray contrast agents. Thus in addition to magnetite, rutile titanate, or a combination of magnetite and rutile titanate, the thermoplastic composition may further include any of the inorganic compounds listed hereinabove provided that any further pigment or filler included does not significantly adversely affect the desired properties of the composition.

In one embodiment, the thermoplastic composition includes X-ray contrast agent in an amount of about 0.01 to about 10 parts by weight, specifically about 0.05 to about 10 parts by weight, more specifically about 0.1 to about 10 parts by weight, still more specifically about 0.1 to about 8 parts by weight, and still yet more specifically about 0.1 to about 6 parts by weight, based on a combined 100 parts by weight of polysiloxane-polycarbonate and any added polycarbonate.

In an alternative embodiment to using an x-ray contrast agent, the thermoplastic composition includes a metal detectable agent in lieu of the x-ray contrast agent (or, in some embodiments both may be used to ensure a composition that may be used with x-ray detectors or metal detectors). The metal detectable agent can be any ferrous or nonferrous metal having good magnetic permeability and/or good electrical conductivity. Most standard metal detectors are capable of detecting materials that are magnetic, such as those containing iron, such as magnetite. However, other metal detectors are capable of detecting a metal based on the electrical conductivity of the material, even if the material is not magnetic, such as copper or aluminum. The concepts of the present invention apply to with regard to any metal detectable agent that may be formed into particles and that are subsequently capable of being detected using a metal detector, ferrous or nonferrous.

In addition, it has been discovered that for compositions having both polycarbonate and a polycarbonate-polysiloxane copolymer, the addition of the metal detectable agent surprisingly helps to retain impact strength even when less siloxane is included in the final composition. In general, the greater the amount of siloxane in the final composition, the better the impact properties. However, in the compositions of the present invention, it has been discovered that better impact properties, such as notched izod impact, can be obtained with compositions having lower amounts of siloxane and a small amount of metal detectable agent.

The metal detectable agent is in the form of particles, and may, depending upon the type used, be a filler, pigment, or other such class of inorganic material having suitable properties as defined herein. The particles as disclosed herein can be used in any suitable morphological form, including but not limited to microparticles, nanoparticles, and particles having various shapes including spheres, rods, faceted crystalline shapes, irregular shapes, and the like. The size of the particles of the metal detectable agent, as measured by the longest dimension and also referred to as both particle size and particle size, can be described more generally using the median of the distribution of the particle sizes, also referred to as the median particle size.

Particle sizes can be determined using various methods, typically light scattering methods including static light scattering (SLS) and dynamic light scattering (DLS), also referred to generally as laser light scattering techniques. In one embodiment, particles of metal detectable agent as disclosed herein have a median particle size ($D_{50}$), of greater than or equal to 5 micrometers, specifically greater than or equal to 8 micrometers, and more specifically greater than or equal to 10 micrometers. In an alternative embodiment, the particles of metal detectable have a median particle size of less than or equal to 50 micrometers, specifically less than or equal to 20 micrometers. In a specific embodiment, useful metal detectable agents have a median particle size 5 to 25 micrometers, specifically 5 to 10 micrometers. The maximum particle size range ($D_{90}$, where 90% of the particles are smaller) for Metal detectable agents varies with the median particle size, and can in general be 5 to 50 micrometers, specifically 5 to 25 micrometers, wherein particles having the maximum particle size constitute less than 5 wt %, specifically less than 3 wt %, of the total weight of particles of Metal detectable agent. The distribution of median particle sizes of a metal detectable agent can be unimodal, bimodal, or multimodal.

In an alternative embodiment, particles of metal detectable agent as disclosed herein have a median particle size ($D_{50}$), of less than or equal to 5 micrometers, specifically less than or equal to 2 micrometers, more specifically less than or equal to 1.5 micrometers, and still more specifically less than or equal to 1 micrometer. In a specific embodiment, useful metal detectable agents have a median particle size from 0.1 to 0.5 micrometers, specifically 0.2 to 0.5 micrometers. In another specific embodiment, useful metal detectable agents have a median particle size 0.5 to 1 micrometer, specifically 0.5 to 0.9 micrometers.

Metal detectable agents can be used in varying stages of compositional purity, provided any impurities present in the thermoplastic composition do not significantly adversely affect the selected properties of the thermoplastic composition. In alternative embodiments, metal detectable agents can have minor amounts of impurities of less than or equal to 0.1% by weight, more specifically less than or equal to 0.01% by weight, and still more specifically less than or equal to 0.001% by weight, based on the total weight of the metal detectable agent. In one embodiment, the Metal detectable agent can contain minor amounts of impurities present as the oxide, hydroxide, carboxylate, carbonate, subcarbonates, phosphate, sulfate, sulfonate, silicate, aluminate, or other salt of metals and/or nonmetals such as lithium, sodium, potassium, magnesium, calcium, barium, silicon, iron, zinc, nickel, copper, boron, aluminum, combinations of these, and the like, in minor amounts so that the selected properties of the thermoplastic composition are not significantly adversely affected. In another embodiment, the metal detectable agent may be treated or purified to remove or reduce the presence of such impurities, where such impurities are initially present (prior to treating or purification) in the metal detectable agent in amounts sufficient to significantly adversely affect the selected properties of the composition. The metal detectable agents disclosed herein do not require separation or purification of phases to provide a suitable material.

The metal detectable agents as used can be untreated, or used as treated, coated, and/or dispersed forms. Any suitable surface coating agent, treatment, or dispersant can be used that is suitable to adjust as desired the dispersing properties, adhesion properties, or other such properties of the metal detectable agent particles used herein. In addition, it is contemplated that the metal detectable agent can be in a single structured particle, or as a core-shell structured particle, with the core and shell layers having different phases or compositions. Any such structure is contemplated, provided the inclusion of the structured particle does not have any significantly adverse effects on the properties of the thermoplastic composition.

Specific compounds that are useful as metal detectable agents include magnetite. In one embodiment, the metal detectable agent can include magnetite, as previously discussed. In one embodiment where magnetite is used, the median particle size of the magnetite is greater than 1 micrometers. In a more specific embodiment, the median particle size of magnetite is 5 to 25 micrometers, specifically 5 to 15 micrometers, and still more specifically 5 to 10 micrometers. In another embodiment where magnetite is used, the median particle size of the magnetite is less than about 1 micrometer. In a more specific embodiment, the median particle size of magnetite is 0.01 to about 0.5 micrometers, specifically about 0.1 to about 0.5 micrometers, and still more specifically about 0.2 to about 0.5 micrometers.

The thermoplastic composition may also include mixtures of metal detectable agents. Thus in addition to magnetite, the thermoplastic composition may further include any additional metal detectable agent that does not significantly adversely affect the selected properties of the composition.

In one embodiment, the thermoplastic composition includes a metal detectable agent in an amount of 0.01 to 10 parts by weight, specifically 0.05 to 10 parts by weight, more specifically 0.1 to 10 parts by weight, still more specifically 0.1 to 8 parts by weight, and still yet more specifically 0.1 to 6 parts by weight, based on a combined 100 parts by weight of polysiloxane-polycarbonate and the polycarbonate.

Also in another embodiment, the thermoplastic composition has a siloxane content of 0.1 to 6 wt %, specifically 0.5 to 6 wt %, more specifically 1 to 6 wt %, still more specifically 1 to 5 wt % siloxane units, and still more specifically 1 to 4 wt % siloxane units, based on the total weight of the thermoplastic composition.

The thermoplastic composition thus includes polycarbonate, polysiloxane-polycarbonate polymer, and either an x-ray conrtrast agent or a metal detectable agent or both. In one embodiment, polycarbonates specifically useful in the thermoplastic polymer include homopolycarbonates, copolycarbonates, polyester-polycarbonates, blends thereof with polyesters, and combinations including at least one of the foregoing polycarbonate-type resins or blends. In a specific embodiment, a thermoplastic composition consists essentially of a polysiloxane-polycarbonate polymer, X-ray contrast agent, and any additional polycarbonate; additives and/or fillers may be included but are not essential to the composition. In another specific embodiment, the thermoplastic composition consists of polysiloxane-polycarbonate polymer and X-ray contrast agent. In another specific embodiment, the thermoplastic composition consists of polysiloxane-polycarbonate polymer, X-ray contrast agent, and an additional polycarbonate. In another specific embodiment, a thermoplastic composition consists essentially of polycarbonate, a polysiloxane-polycarbonate polymer, a metal detectable agent, and any additives and/or fillers that are not essential to the composition. In another specific embodiment, the thermoplastic composition consists of polysiloxane-polycarbonate polymer and metal detectable agent. In another specific embodiment, the thermoplastic composition consists of polysiloxane-polycarbonate polymer, metal detectable agent, and an additional polycarbonate.

In addition to the polycarbonate, the polysiloxane-polycarbonate copolymer and x-ray contrast agent or metal detectable agent, the thermoplastic composition can further include various other additives ordinarily incorporated with thermoplastic compositions of this type, where the additives are selected so as not to significantly adversely affect the selected properties of the thermoplastic composition. Mixtures of additives may be used. Such additives may be mixed at a suitable time during the mixing of the components for forming the thermoplastic composition.

Useful additives contemplated herein include, but are not limited to, impact modifiers, fillers, colorants including dyes and pigments, antioxidants, heat stabilizers, light and/or UV light stabilizers, plasticizers, lubricants, mold release agents, flame retardants, antistatic agents, anti-drip agents, radiation (gamma) stabilizers, and the like, or a combination including at least one of the foregoing additives. While it is contemplated that other resins and or additives may be used in the thermoplastic compositions described herein, such additives while useful in some exemplary embodiments are not essential.

Surprisingly, it has been found that a thermoplastic composition comprising a polysiloxane-polycarbonate and magnetite or rutile titanate as the X-ray contrast agent in amounts of less than 10 wt % of the thermoplastic composition has, in addition to sufficient X-ray contrast, desirably improved thermal and chemical stability. Thermal and chemical stability for the polycarbonate groups of the thermoplastic composition are seen in a minimal or low increase (shift) in melt volume flow rate (MVR) of less than or equal to 31% for MVR values obtained for identical samples of the thermoplastic composition at a normal dwell of 6 minutes and at a more punishing dwell of 18 minutes, using MVR measurement conditions of about 300° C. and 1.2 kg of force according to ASTM D1238-04. Any degradation of the polycarbonate-based composition was thus minimal relative to that observed for non-magnetite or rutile titanate X-ray contrast agents. Mechanical properties of the thermoplastic composition are also retained when magnetite having a small median particle size (e.g., less than or equal to about 1.0 micrometers) or rutile titanates are used as X-ray contrast agents, in particular where notched Izod impact (NII) values of greater than or equal to about 409 J/m at −30° C., greater than about 559 J/m at −20° C., and/or greater than or equal to about 620 J/m at 0° C., with 100% retention of ductility at these temperatures (based on 100% of a test set of at least 5 molded samples exhibiting a ductile fracture mode, carried out according to ASTM D256-04). The thermoplastic composition additionally exhibits improved ductility at low temperatures (as low as −30° C.) compared to comparable thermoplastic compositions prepared identically but using X-ray contrast agents (e.g., barium salts, bismuth salts, spinel pigments, and the like) other than magnetite or rutile titanate particles.

MVR shift was determined from MVR measurements in units of cc/10 min. made at 300° C. under a load of 1.2 kg, and at dwell times of 6 and 18 minutes according to ASTM D1238-04. MVR shift (i.e., increase in MVR) is calculated according to the following equation:

$$MVR\ \text{Shift}\ (\%) = \{[(MVR\ @18\ min) - (MVR\ @6\ min)]/[MVR\ @6\ min]\} \times 100,$$

where MVR @18 min. represents the MVR determined at a dwell time of 18 minutes, and MVR @6 min. represents the MVR determined at a dwell time of 6 minutes. Thus, in an embodiment, for melt volume rates of the thermoplastic composition determined under a load of 1.2 kg at a temperature of 300° C. according to ASTM D1238-04, a melt volume rate measured at a dwell time of 18 minutes increases relative to a melt volume rate measured at a dwell time of 6 minutes by less than or equal to 31%, specifically by less than or equal to about 20%, and more specifically by less than or equal to 16%.

Surprisingly, it has also been found that a thermoplastic composition including polycarbonate, a polysiloxane-polycarbonate and magnetite as the metal detectable agent in amounts of less than 10 wt % of the thermoplastic composition can be used to create a metal detectable polycarbonate-polysiloxane formulation. The particle size of the magnetite is so chosen that key properties (flow, low temperature impact, gloss) of the composition are capable of being maintained. Mechanical properties of the thermoplastic composition are also retained when magnetite having a selected median particle size is used as the metal detectable agent, in particular, to form articles that, when molded from the thermoplastic composition and having a thickness of 3.2 mm, has a notched Izod impact (NII) strength of greater than or equal to 300 J/m, when measured at a temperature of 23° C. according to ASTM D256-04, or a notched Izod impact strength of greater than or equal to 150 J/m, when measured at a temperature of 0° C. according to ASTM D256-04 (based on 100% of a test set of at least 5 molded samples exhibiting a ductile fracture mode, carried out according to ASTM D256-04).

In embodiments using an x-ray contrast agent, an article molded from the thermoplastic composition and having a thickness of 3.2 mm has a notched Izod impact (NII) strength of greater than or equal to about 621 J/m, specifically greater than or equal to about 689 J/m, more specifically greater than or equal to about 690 J/m, and still more specifically greater than or equal to about 694 J/m, when measured at a temperature of 23° C., according to ASTM D256-04. Also in this embodiment, for a test set of at least 5 molded articles of 3.2 mm thickness and molded from the thermoplastic composition, 100% of the articles exhibited ductile fracture mode when measured at a temperature of 23° C., according to ASTM D256-04.

In alternative embodiments using an x-ray contrast agent, an article molded from the thermoplastic composition and having a thickness of 3.2 mm has a notched Izod impact (NII) strength of greater than or equal to about 620 J/m, specifically greater than or equal to about 640 J/m, more specifically greater than or equal to about 660 J/m, and still more specifically greater than or equal to about 680 J/m, when measured at a temperature of 0° C., according to ASTM D256-04. Also in an embodiment, for a test set of at least 5 molded articles of 3.2 mm thickness and molded from the thermoplastic composition, 100% of the articles exhibited ductile fracture mode when measured at a temperature of 0° C., according to ASTM D256-04.

In still other alternative embodiments using an x-ray contrast agent, an article molded from the thermoplastic composition and having a thickness of 3.2 mm has a notched Izod impact (NII) strength of greater than or equal to about 475 J/m, specifically greater than or equal to about 480 J/m, more specifically greater than or equal to about 490 J/m, and still more specifically greater than or equal to about 500 J/m, when measured at a temperature of −10° C., according to ASTM D256-04. Also in an embodiment, for a test set of at least 5 molded articles of 3.2 mm thickness and molded from the thermoplastic composition, 100% of the articles exhibited ductile fracture mode when measured at a temperature of −10° C., according to ASTM D256-04.

In yet other alternative embodiments using an x-ray contrast agent, an article molded from the thermoplastic composition and having a thickness of 3.2 mm has a notched Izod impact (NII) strength of greater than or equal to about 560

J/m, specifically greater than or equal to about 600 J/m, more specifically greater than or equal to about 650 J/m, and still more specifically greater than or equal to about 674 J/m, when measured at a temperature of −20° C., according to ASTM D256-04. Also in an embodiment, for a test set of at least 5 molded articles of 3.2 mm thickness and molded from the thermoplastic composition, 100% of the articles exhibited ductile fracture mode when measured at a temperature of −20° C., according to ASTM D256-04.

In still other alternative embodiments using an x-ray contrast agent, an article molded from the thermoplastic composition and having a thickness of 3.2 mm has a notched Izod impact (NII) strength of greater than or equal to about 409 J/m, specifically greater than or equal to about 450 J/m, more specifically greater than or equal to about 512 J/m, and still more specifically greater than or equal to about 527 J/m, when measured at a temperature of −30° C., according to ASTM D256-04. Also in an embodiment, for a test set of at least 5 molded articles of 3.2 mm thickness and molded from the thermoplastic composition, 100% of the articles exhibited ductile fracture mode when measured at a temperature of −30° C., according to ASTM D256-04. It will be appreciated that the thermoplastic composition disclosed herein meets at least one of the foregoing notched Izod impact values measured at at least one of the foregoing temperatures of 23° C., 0° C., −10° C., −20° C., and/or −30° C.

In yet other alternative embodiments using an x-ray contrast agent, the surface gloss of the thermoplastic composition, measured at an angle of 60 degrees (°) on 3 mm colored chips, is greater than or equal to 90 gloss units (GU), specifically greater than or equal to 95 GU, more specifically greater than or equal to 96 GU, still more specifically greater than or equal to 98 GU, and still more specifically greater than or equal to 100 GU, according to ASTM D2457. The measure of gloss according to this embodiment can be used a surrogate measurement for regularity and finish (i.e., smoothness) of the surface of the article, where increasing gloss correlates to an increase in surface smoothness and therefore fewer surface defects for an article molded from the thermoplastic composition. In a specific embodiment, a high gloss of greater than 90 GU is desirable in a chocolate mold molded from the thermoplastic composition, wherein the high surface gloss and smoothness of the chocolate mold proportionally imparts a desirable surface gloss to chocolates molded in the chocolate mold.

In embodiments using a metal detectable agent, an article molded from the thermoplastic composition and having a thickness of 3.2 mm has a notched Izod impact (NII) strength of greater than or equal to 350 J/m, specifically greater than or equal to 400 J/m, more specifically greater than or equal to 450 J/m, and still more specifically greater than or equal to 500 J/m, when measured at a temperature of 23° C., according to ASTM D256-04. Also in an embodiment, for a test set of at least 5 molded articles of 3.2 mm thickness and molded from the thermoplastic composition, 100% of the articles exhibited ductile fracture mode when measured at a temperature of 23° C., according to ASTM D256-04.

In alternative embodiments using a metal detectable agent, an article molded from the thermoplastic composition and having a thickness of 3.2 mm has a notched Izod impact (NII) strength of greater than or equal to 200 J/m, specifically greater than or equal to 250 J/m, more specifically greater than or equal to 300 J/m, and still more specifically greater than or equal to 350 J/m, when measured at a temperature of 0° C., according to ASTM D256-04. Also in an embodiment, for a test set of at least 5 molded articles of 3.2 mm thickness and molded from the thermoplastic composition, 100% of the articles exhibited ductile fracture mode when measured at a temperature of 0° C., according to ASTM D256-04.

In those embodiments wherein an x-ray contrast agent is used, an article molded from the thermoplastic composition demonstrates X-ray contrast. The article may be observed qualitatively by being observable in an X-ray image against a non-contrasting, or a less contrasting, background material. For example, an X-ray image of an article comprising the thermoplastic composition is observable against an article comprising organic material (such as a chocolate bar), a thermoplastic polymer (such as bisphenol A polycarbonate) or a composition identical to the thermoplastic composition of the instant invention but which does not include an X-ray contrast agent.

Alternatively, the X-ray contrast may be quantified by gray scale measurement of an X-ray image of an article comprising the thermoplastic composition. This can be accomplished by preparing a calibration curve that correlates gray scale intensity with thickness for a series of X-ray scattering standards (such as a series of aluminum films or plates, each having known thicknesses). X-ray transmission intensity through the standards may be quantified directly by irradiating the standards (and samples) with X-ray radiation of a known intensity, and obtaining transmission data directly using an X-ray detector. Alternatively, a digital image of an irradiated standard may be obtained using a charge-coupled device, the gray shading of the resulting image may be pixelated, and the gray scale intensity of one or more sample areas of the image may be averaged and thus used to determine overall gray-scale intensity for each standard (and sample). Plotting intensity (y-axis) versus thickness (x-axis) for each standard provides a correlation by which intensity of a sample (molded from the thermoplastic composition, and of known thickness) can be translated to an equivalent thickness for the material of the standard. It has been found, using X-ray radiation of 50 to 80 kV and aluminum standards, that an article of 3.2 mm thickness, molded from the thermoplastic composition has an Equivalent Aluminum ("Al") thickness of greater than 0.51 mm, compared with an equivalent Al thickness of 0.49 mm for a commercial grade bisphenol A polycarbonate.

Thus, in one embodiment, an article molded from the thermoplastic composition and having a thickness of 3.2 mm has an equivalent A1 thickness of greater than 0.51 mm, specifically greater than 0.52 mm, more specifically greater than 0.55 mm, and still more specifically greater than or equal to 0.58 mm, when irradiated with 50 kV X-ray radiation.

In those embodiments wherein a metal detectable agent is used, an article molded from the thermoplastic composition demonstrates metal detectability. For example, a metal detector will sound when an article including the thermoplastic composition is scanned against an article including an organic material (such as a chocolate bar), a thermoplastic polymer (such as bisphenol A polycarbonate) or a composition identical to the thermoplastic composition of the instant invention but which does not include the metal detectable agent.

Thus, thermoplastic compositions for molding or extruding applications requiring X-ray contrast as well as minimal or no decomposition and retention of desirable mechanical properties are achieved by use of a polysiloxane-polycarbonate in combination with an X-ray contrast agent comprising a small (less than 1 micrometer) median particle size magnetite, or a rutile titanate pigment. Alternatively, thermoplastic compositions for molding or extruding applications requiring metal detectability as well as minimal or no decomposition and retention of desirable mechanical properties are achieved by use of polycarbonate and polysiloxane-polycarbonate in combination with a metal detectable agent.

The thermoplastic composition may be manufactured by methods generally available in the art, for example, in one embodiment, in one manner of proceeding, powdered polysiloxane-polycarbonate, the X-ray contrast agent or metal detectable agent, and any added polycarbonate, and other additives as desired are first mixed in a HENSCHEL MIXER® high speed mixer. Other low shear processes including but not limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. Additives may also be compounded into a masterbatch with a selected polymeric resin and fed into the extruder. In one embodiment, the x-ray contrast agent or metal detectable agent is previously compounded with a polysiloxane-polycarbonate masterbatch. The extruder is generally operated at a temperature higher than that necessary to cause the composition to flow, but at which temperature components of the thermoplastic composition do not decompose so as to significantly adversely affect the composition. The extrudate is immediately quenched in a water batch and pelletized. The pellets, so prepared, when cutting the extrudate may be one-fourth inch long or less as desired. Such pellets may be used for subsequent molding, shaping, or forming In an x-ray contrast embodiment, a method of preparing a thermoplastic composition includes melt combining a polysiloxane-polycarbonate, X-ray contrast agent, and any added polycarbonate. The melt combining can be done by extrusion. In one embodiment, the proportions of polysiloxane-polycarbonate, X-ray contrast agent, and any added polycarbonate are selected such that the resultant composition maximizes the X-ray contrast capability while not significantly adversely affecting MVR (as determined by the MVR shift for samples measured at dwell times of 6 and 18 minutes as described hereinabove and as exemplified hereinbelow) or low temperature NII and ductility. In a further specific embodiment, the thermoplastic polymer includes a polycarbonate-type polymer as defined hereinabove. In one embodiment, a method of preparing a thermoplastic composition comprises melt blending a masterbatch comprising polysiloxane-polycarbonate, X-ray contrast agent, and any added polycarbonate, with additional polysiloxane-polycarbonate and/or polycarbonate polymer.

In a metal detectable embodiment, a method of preparing a thermoplastic composition includes melt combining polycarbonate, a polysiloxane-polycarbonate copolymer and a metal detectable agent. The melt combining can be done by extrusion. In an embodiment, the proportions of polycarbonate, polysiloxane-polycarbonate and metal detectable agent are selected such that the resultant composition maximizes the metal detectable capability while not significantly adversely low temperature NII and ductility.

In an x-ray contrast embodiment, including the X-ray contrast agent enhances the X-ray contrast of an article against a background material. In one embodiment, a method for increasing the X-ray contrast in an article including a polysiloxane-polycarbonate composition includes combining a contrast agent having a median particle size of less than or equal to 5 micrometers, with a polysiloxane-polycarbonate and optionally a polycarbonate, and forming the article from the polysiloxane-polycarbonate composition. In one embodiment, the contrast agent includes an element having an atomic number of greater than or equal to 22.

In a specific embodiment, the extruder is a twin-screw extruder. The extruder is typically operated at a temperature of 180 to 385° C., specifically 200 to 330° C., more specifically 220 to 300° C., wherein the die temperature may be different. The extruded thermoplastic composition is quenched in water and pelletized.

Shaped, formed, or molded articles including the thermoplastic compositions are also provided. The thermoplastic compositions may be molded into useful shaped articles by a variety of means such as injection molding, extrusion, rotational molding, blow molding and thermoforming In a specific embodiment, molding is done by injection molding. Beneficially, the thermoplastic composition has excellent mold filling capability due to its high flow properties.

The thermoplastic composition can be provided as pellets, and is useful to form articles, including articles for the food service industry such as for example molds, utensils, trays, sheets, packaging, and the like; medical devices and consumables such as bottles, syringes, catheters, labware, and other articles and consumables; and toys including molded plastic toys and packaging. In a specific embodiment, a useful article is a mold for preparing candies, and in a more specific embodiment, the mold is a mold for manufacturing chocolate.

In one embodiment, a mold for manufacturing chocolate and comprising polysiloxane-polycarbonate, optionally polycarbonate, and the X-ray contrast agent, exhibits X-ray contrast, wherein chocolates manufactured with the mold exhibit a high surface gloss and aesthetically pleasing appearance. In another embodiment, the chocolate mold includes 0.01 to 10 parts by weight of an X-ray contrast agent including rutile titanate having a median particle size of less than or equal to about 5 micrometers, magnetite having a median particle size of less than or equal to about 0.5 micrometers, or a combination including at least one of the foregoing X-ray contrast agents. In an alternative embodiment, a mold for manufacturing chocolate and including polysiloxane-polycarbonate, polycarbonate, and the metal detectable agent, exhibits metal detectability, wherein chocolates manufactured with the mold exhibit a high surface gloss and aesthetically pleasing appearance. In another embodiment, the chocolate mold includes 0.01 to 10 parts by weight of a metal detectable agent.

While specific applications and articles are disclosed herein, one skilled in the art will appreciate that the applications of the thermoplastic compositions herein should not be considered as limited to these applications.

The thermoplastic composition is further illustrated by the following non-limiting examples.

All thermoplastic compositions for the examples (abbreviated Ex. in the following tables) and comparative examples (abbreviated Cex. in the following tables) were prepared using one or more of the following components listed in Table 1, to evaluate different inorganic compounds for use as metal detectable agents, and thereby determine the effect of these inorganic compounds on metal detectability of polycarbonate, polycarbonate-polysiloxane compositions.

All thermoplastic compositions were compounded on a Werner and Pfleiderer ZSK 25-mm twin-screw extruder operating at temperatures of from 260 to 300° C. The twin-screw extruder had enough distributive and dispersive mixing elements to produce good mixing of the polymer compositions. The compositions were subsequently dried at 120° C. for 4 hours and then molded on a Husky or BOY injection-molding machine using barrel temperatures of from 270 to 300° C. and mold temperatures of from 65 to 80° C. It will be recognized by one skilled in the art that the extrusion and molding methods are not limited to these temperatures.

The first set of examples and the data were for x-ray detectable embodiments of the present invention. The components used are set forth below in Table 1 and the corresponding results are set forth in Tables 2-6 and FIGS. 1-4.

TABLE 1

Materials used for x-ray contrast embodiments

| Component | Description | Source |
|---|---|---|
| PC-Si | LEXAN ™ EXL Polysiloxane-polycarbonate, 6 wt % dimethylsiloxane, average polysiloxane block length of 45 siloxane repeating units, Mw = 22,500-23,500 g/mol | SABIC Innovative Plastics |
| PC-1 | LEXAN ™ High Flow Bisphenol A (BPA) Polycarbonate MVR = 6-8 cc/10 min at 300° C. under 1.2 kg load, Mw 21,600-21,900 g/mol | SABIC Innovative Plastics |
| PC-2 | LEXAN ™ BPA Polycarbonate, MVR = 10-12 cc/10 min at 300° C. under 1.2 kg load, Mw = 29,500-29,900 g/mol | SABIC Innovative Plastics |
| PC-3 | LEXAN ™ BPA Polycarbonate (with mold release agent), MVR = 10-12 cc/10 min at 300° C. under 1.2 kg load | SABIC Innovative Plastics |
| I-168 | IRGAFOS ® 168 antioxidant (Tris-(2,6-di-tert-butylphenyl)phosphite) | Ciba Specialty Chemicals |
| Barium Sulfate | Powder, median particle size = 5-10 μm | Polar Minerals |
| Magnetite-1 | MAGNIF ® 10 functional filler with particle size $D_{10}$ = 5 μm, $D_{50}$ = 10 μm (median particle size), and $D_{90}$ = 25 μm | Minelco, The Netherlands |
| Bismuth Oxide | Powder, median particle size $D_{50}$ = 5-6 micrometers | MCP Metal Specialties |
| Bismuth Subcarbonate | Powder, median particle size $D_{50}$ = 7 μm | MCP Metal Specialties |
| Zinc Sulfide | SACHTOLITH ® HD-S, median particle size $D_{50}$ = 0.3 μm | Sachtleben |
| Pigment Blue 28 | Arctic Blue # 3 (Cobalt aluminate blue, spinel pigment), median particle size $D_{50}$ = 1.4 μm | Shepherd Color |
| Pigment Green 50 | V11633 Cobalt titanate green, spinel pigment, median particle size $D_{50}$ = 1.39 μm | Ferro |
| Pigment Yellow 53 | SICOTAN ® Yellow K 1010, Nickel Antimony yellow, rutile titanate pigment, median particle size $D_{50}$ = 1.0 μm | BASF |
| Pigment Brown 24 | SICOTAN ® Yellow K 2001 FG, Chromium Antimony yellow, rutile titanate pigment, median particle size $D_{50}$ = 0.68 μm | BASF |
| Pigment Yellow 163 | METEOR ® Orange 7383, Chromium tungsten orange, rutile titanate pigment, median particle size $D_{50}$ < 1.5 μm | BASF |
| Magnetite SMT-01S | Magnetite, median particle size $D_{50}$ = 0.3 μm | Saehan Media Co., Ltd., Korea |

Melt stability, measured as melt-volume rate (MVR) of the compositions was determined by two techniques: MVR shift, which is a determination of the difference between MVR measured at a dwell time of 6 minutes, and the MVR measured at a dwell time of 18 minutes; and the viscosity (rheological) change (referred to as "rheo change" in the following tables), reported as the percentage change in final viscosity versus the initial viscosity (i.e., where a negative value represents a decrease in viscosity, and a positive value represents an increase in viscosity) for a sample measured at 300° C. at a dwell time of 30 minutes. The rheological change is reported in units of percent and represents the change in viscosity over the initial viscosity as a function of dwell time. The rheology change method is based upon, but not in full compliance with, ISO 6721-10 and ASTM D4440. In the method, the test sample (in pellet form) is initially dried at 120° C. for 3 to 4 hours. The sample is then placed onto a parallel-plate or cone-plate rheometer fixture in a dynamic mechanical analyzer (DMA) and then heated to the desired temperature (e.g., 300° C.). An inert gas (e.g., nitrogen) with controlled composition or purity was introduced as necessary to purge the apparatus and thereby minimize possible thermal degradation of the test sample.

MVR was determined at 300° C. under a load of 1.2 kg, and at dwell times of 6 and 18 minutes and is reported in units of cc/10 min. according to ASTM D1238-04. MVR shift (i.e., increase in MVR) is calculated according to the following equation:

$$\text{MVR Shift (\%)} = \{[(MVR\ @18\ \min) - (MVR\ @6\ \min)] / [MVR\ @6\ \min]\} \times 100,$$

where MVR @18 min. represents the MVR determined at a dwell time of 18 minutes, and MVR @6 min. represents the MVR determined at a dwell time of 6 minutes.

Notched Izod impact (NII) testing was determined on 3.2 mm thick bars according to ASTM D256-04, at temperatures of 23° C., 0° C., −10° C., −20° C., and −30° C., where the NII impact strength is reported in units of joules per meter (J/m), and the percent ductility is defined as the percent of molded sample articles in a test set of at least 5 samples which exhibit ductile fracture mode. Surface gloss was tested according to ASTM D2457 at 60° using a Garden Gloss Meter and 3 mm thick color chips and is reported in gloss units (GU) relative to a comparative gloss level of a standard black glass chip of 100

GU. The X-ray measurements were made using a Torex D 150 X-ray tube with a 1.5 mm beam diameter and an X-ray tube operating at 0-150 kV and 0-5 mA, purchased from Northstar Imaging (Rogers, Minn.). The detector is a 9-inch (22.9 cm) high-resolution image intensifier that can be used in this mode or in 6 inch (15 cm) or 4 inch (10 cm) modes allowing for a small amount of magnification. The instrument is also equipped with a 1-megapixel digital camera allowing for real-time X-ray image analysis and digital image capture. The instrument settings were previously optimized to provide good accuracy and precision. All measurements were taken using the 9-inch image intensifier, with the X-ray source operated at 50, 70 or 80 kV, and 3 mA.

evidence of instability as seen in the 26% loss in viscosity in the dwell rheology test. The bismuth containing fillers (CEx. 6-9) cause the composition to degrade (e.g., a 3×-6× increase in MVR for CEx. 8 and 9 (bismuth subcarbonate)) even under standard 6 minute dwell conditions, possibly due to the presence of ionic contaminants (such as carbonates or metals) which can catalyze hydrolysis. Thus, bismuth fillers were eliminated as potential candidates for use. Passivating techniques (e.g., coating, acid quenching, or the like) may, however, potentially be used to treat such fillers to eliminate melt stability issues upon compounding and thus increase compatibility with polycarbonate.

TABLE 2

| Component | CEx. 1 | CEx. 2 | CEx. 3 | CEx. 4 | CEx. 5 | CEx. 6 | CEx. 7 | CEx. 8 |
|---|---|---|---|---|---|---|---|---|
| PC-1 (phr) | 6 | 6 | 6 | 6 | 6 | 6 | 6 | 6 |
| PC-2 (phr) | 11 | 11 | 11 | 11 | 11 | 11 | 11 | 11 |
| PC-Si (phr) | 83 | 83 | 83 | 83 | 83 | 83 | 83 | 83 |
| I-168 (phr) | 0.06 | 0.06 | 0.06 | 0.06 | 0.06 | 0.06 | 0.06 | 0.06 |
| Inorganic Compound | — | Barium Sulfate | Barium Sulfate | Magnetite-1 | Magnetite-1 | Bismuth Oxide | Bismuth Oxide | Bismuth Subcarbonate |
| Inorganic Compound Loading (phr) | — | 1 | 5 | 1 | 5 | 1 | 5 | 1 |
| Total (phr) | 100.06 | 101.06 | 105.06 | 101.06 | 105.06 | 101.06 | 105.06 | 101.06 |
| MVR (6 min. dwell) cc/10 min | 10.5 | 10.3 | 11.0 | 10.4 | 10.5 | 11.2 | 27.3 | 64.1 |
| MVR (18 min. dwell) cc/10 min | 10.7 | 10.6 | 12.5 | 11.1 | 11.3 | — | — | — |
| MVR shift (6 min/18 min) (%) | 2 | 3 | 14 | 7 | 8 | — | — | — |
| Rheo Change (%) | −8 | −11 | −26 | −11 | −12 | −10 | −20 | −18 |

| Component | CEx. 9 | CEx. 10 | CEx. 11 | CEx. 12 | Ex. 1 | Ex. 2 | Ex. 3 |
|---|---|---|---|---|---|---|---|
| PC-1 (phr) | 6 | 6 | 6 | 6 | 6 | 6 | 6 |
| PC-2 (phr) | 11 | 11 | 11 | 11 | 11 | 11 | 11 |
| PC-Si (phr) | 83 | 83 | 83 | 83 | 83 | 83 | 83 |
| I-168 (phr) | 0.06 | 0.06 | 0.06 | 0.06 | 0.06 | 0.06 | 0.06 |
| Inorganic Compound | Bismuth Subcarbonate | Zinc Sulfide | Pigment Blue 28 | Pigment Green 50 | Pigment Yellow 53 | Pigment Brown 24 | Pigment Yellow 163 |
| Inorganic Compound Loading (phr) | 5 | 2 | 3 | 2 | 1 | 1 | 1 |
| Total (phr) | 105.06 | 102.06 | 103.06 | 102.06 | 101.06 | 101.06 | 101.06 |
| MVR (6 min. dwell) cc/10 min | 348 | 20 | 42 | 43 | 10.6 | 12 | 11.4 |
| MVR (18 min. dwell) cc/10 min | — | — | — | — | 11.4 | 13.7 | 12.5 |
| MVR shift (6 min/18 min) (%) | — | — | — | — | 8 | 14 | 10 |
| Rheo Change (%) | −180 | −8 | −40 | −28 | −13 | −20 | −14 |

Table 2 shows the MVR data for the 14 compositions prepared as described above. Comparative Example 1 (CEx. 1) with no fillers or pigments had an MVR of 10.5 cc/10 min. under the conditions. Under an abusive dwell time of 18 minutes, the MVR shift seen for CEx. 1 was minimal at 2%. Barium sulfate and Magnetite-1 (CExs. 2-5) each showed good stability under the conditions studied as judged by the MVR data. However, 5% barium sulfate (CEx. 3) showed Regarding the pigments, the zinc sulfide and the spinel-structured pigments (Pigment Blue 28 and Pigment Green 50, CExs. 11 and 12, respectively) also degraded the polycarbonate composition (as seen in a 2×-4× increase in MVR relative to CEx. 1) and are therefore not useful. The rutile titanate pigments (Exs. 1-3) as tested each showed good melt stability at both 6 and 18 minute dwells as compared to CEx. 1 without added inorganic compound (i.e., MVR changes by less than 15% for each of these examples). Viscosity increase in the dwell rheology test was also within acceptable limits for each of these examples (i.e., −20% to 0% or greater).

Table 3 shows NII data for the compositions made with the inorganic compounds.

at room temperature, depending on the filler loading as shown in the comparison of e.g., CEx. 1 with CExs. 2 and 3; with CExs. 4 and 5; with CExs. 6 and 7; and with 8 and 9, where each pair of comparative examples has a pigment or filler loading of 1 and 5 phr.

TABLE 3

| Component | CEx. 1 | CEx. 2 | CEx. 3 | CEx. 4 | CEx. 5 | CEx. 6 | CEx. 7 | CEx. 8 |
|---|---|---|---|---|---|---|---|---|
| Inorganic Compound | — | Barium Sulfate | Barium Sulfate | Magnetite-1 | Magnetite-1 | Bismuth Oxide | Bismuth Oxide | Bismuth Subcarbonate |
| Inorganic Compound Loading (phr) | — | 1 | 5 | 1 | 5 | 1 | 5 | 1 |
| NII (23° C.) | | | | | | | | |
| Impact (J/m) | 836 | 636 | 306 | 463 | 194 | 723 | 427 | 505 |
| Ductility (%) | 100 | 100 | 100 | 100 | 100 | 100 | 60 | 100 |
| NII (0° C.) | | | | | | | | |
| Impact (J/m) | — | — | — | — | — | — | — | — |
| Ductility (%) | — | — | — | — | — | — | — | — |
| NII (−10° C.) | | | | | | | | |
| Impact (J/m) | 752 | 268 | 140 | — | — | 472 | 175 | 349 |
| Ductility (%) | 100 | 80 | 0 | — | — | 100 | 0 | 60 |
| NII (−20° C.) | | | | | | | | |
| Impact (J/m) | — | — | — | — | — | — | — | — |
| Ductility (%) | — | — | — | — | — | — | — | — |
| NII (−30° C.) | | | | | | | | |
| Impact (J/m) | 733 | — | — | 148 | 118 | 235 | 141 | 247 |
| Ductility (%) | 100 | — | — | 0 | 0 | 0 | 0 | 0 |
| 60° Gloss | — | — | — | 96.1 | 85.2 | 101.8 | 89.7 | — |

| Component | CEx. 9 | CEx. 10 | CEx. 11 | CEx. 12 | Ex. 1 | Ex. 2 | Ex. 3 |
|---|---|---|---|---|---|---|---|
| Inorganic Compound | Bismuth Subcarbonate | Zinc Sulfide | Pigment Blue 28 | Pigment Green 50 | Pigment Yellow 53 | Pigment Brown 24 | Pigment Yellow 163 |
| Inorganic Compound Loading (phr) | 5 | 2 | 3 | 2 | 1 | 1 | 1 |
| NII (23° C.) | | | | | | | |
| Impact (J/m) | 108 | 688 | 495 | 532 | 810 | 784 | 793 |
| Ductility (%) | 0 | 100 | 100 | 100 | 100 | 100 | 100 |
| NII (0° C.) | | | | | | | |
| Impact (J/m) | — | 618 | 390 | 342 | 741 | 733 | 740 |
| Ductility (%) | — | 100 | 0 | 60 | 100 | 100 | 100 |
| NII (−10° C.) | | | | | | | |
| Impact (J/m) | 104 | — | — | — | — | — | — |
| Ductility (%) | 0 | — | — | — | — | — | — |
| NII (−20° C.) | | | | | | | |
| Impact (J/m) | — | 559 | 222 | 265 | 697 | 674 | 694 |
| Ductility (%) | — | 100 | 0 | 0 | 100 | 100 | 100 |
| NII (−30° C.) | | | | | | | |
| Impact (J/m) | 86 | 512 | 208 | 207 | 650 | 641 | 634 |
| Ductility (%) | 0 | 80 | 0 | 0 | 100 | 100 | 100 |
| 60° Gloss | — | — | — | — | 100.3 | 100.9 | 95.7 |

As seen in the data in Table 3, the polysiloxane-polycarbonate-containing compositions exhibited good ductile fracture mode properties at low temperatures. In Table 3, it can be seen that CEx. 1 is ductile (i.e., 100% ductile fracture) at room temperature (23° C.) with an impact strength of 836 J/m as well as ductility at −30° C. with an impact strength of 733 J/m. It is essential that the X-ray detectable formulation also retain this property. Addition of the inorganic compounds (pigments or fillers) thus significantly reduces the impact strength, even Ductility is observed for all of the comparative Examples (CExs. 2-12) at room temperature but the fracture mechanism changes to brittle mode, completely or partially depending on the identity of the filler, at lower temperatures. None of the filled comparative examples (CExs. 2-12) showed 100% ductility at −30° C. The median particle size of the fillers used ranged from 5-25 micrometers. The effect on impact properties for these inorganic compounds is therefore significant due to composition of the inorganic compounds and particle size (see e.g. magnetite in CEx. 4 and 5, and in Examples 4-8 below).

Table 3 shows the NII data for compositions containing zinc sulfide and various complex inorganic colored pigments, several of which contain X-ray scattering metal ions (i.e., metals having an atomic number of 22 or greater as defined hereinabove). Zinc sulfide and the spinel-structured pigment containing formulations (CExs. 10-12) each showed loss of impact strength and ductility relative to unfilled/unpigmented comparative example CEx. 1. The rutile titanate pigments (Exs. 1-3), however, each showed a minimal loss in impact strength at room temperature (i.e., less than about 10%) and retained ductility. Surprisingly, even at −30° C., the same trend is also seen in the compositions of Exs. 1-3, with these formulations showing less than a 10% drop in NII compared to CEx. 1, and 100% ductility at all temperatures. For comparative purposes, the NII and ductility at −30° C. for PC-1, PC-2, and PC-3 are, respectively, 846 J/m (100% ductility), 317 J/m (20% ductility), and 143 J/m (0% ductility) (not shown in Table 3). Thus, rutile titanate pigments exhibit desirable NII and ductility unlike the zinc sulfide or spinel pigments, and the rutile titanate pigments are therefore useful in preparing X-ray detectable compositions that retain their NII and ductility properties.

Table 3 also shows 60 degree gloss data determined for the compositions tested on color chips. The Pigment Yellow 163 formulation (Ex. 3) shows a slight loss of gloss (to about 95 GU, for a loss of about 5 relative to the standard), however the loss is not as great as that observed for chips containing fillers (CEx. 5 containing magnetite at 5 phr with a gloss of 85.2 GU, and CEx. 7 containing bismuth oxide at 5 phr with a gloss of 89.7 GU). Retention of gloss is highly desirable for preparing, for example, molds for the chocolate industry, so that an aesthetically pleasing, glossy chocolate surface can be obtained for chocolates prepared from the mold. Pigments (e.g., in Ex. 1-3) thus facilitate good mold surface replication as opposed to fillers where surface imperfections may form due to larger particle size.

Decreasing particle size of the inorganic additives can lead to better impact retention and other properties, while still maintaining X-ray contrast. Magnetite with a median particle size of 0.2-0.5 micrometers (i.e., 200-500 nm; Magnetite SMT-01S in Table 1) was therefore evaluated in the formulations shown in Table 4 below at five different loadings.

TABLE 4

| Component | Ex. 4 | Ex. 5 | Ex. 6 | Ex. 7 | Ex. 8 |
|---|---|---|---|---|---|
| PC-1 (phr) | 6 | 6 | 6 | 6 | 6 |
| PC-2 (phr) | 11 | 11 | 11 | 11 | 11 |
| PC-Si (phr) | 83 | 83 | 83 | 83 | 83 |
| I-168 (phr) | 0.06 | 0.06 | 0.06 | 0.06 | 0.06 |
| Magnetite (SMT-01S) (phr) | 0.1 | 1 | 3 | 6 | 10 |
| Total (phr) | 100.16 | 101.06 | 103.06 | 106.06 | 110.06 |
| MVR (6 min. dwell) cc/10 min | 9.85 | 9.74 | 9.97 | 10.6 | 11.8 |
| MVR (18 min. dwell) cc/10 min | 9.67 | 9.65 | 11.9 | 11.6 | 17 |
| MVR shift (6 min/18 min) (%) | −2 | −1 | 16 | 9 | 31 |
| Rheo Change (% change) | −8 | −16 | −16 | −29 | −39 |
| NII (23° C.) | | | | | |
| Impact (J/m) | 825 | 794 | 736 | 694 | 621 |
| Ductility (%) | 100 | 100 | 100 | 100 | 100 |
| NII (−10° C.) | | | | | |
| Impact (J/m) | 741 | 736 | 661 | 561 | 501 |
| Ductility (%) | 100 | 100 | 100 | 100 | 100 |
| NII (−30° C.) | | | | | |
| Impact (J/m) | 697 | 643 | 605 | 527 | 409 |
| Ductility (%) | 100 | 100 | 100 | 100 | 100 |
| 60° Gloss | 100.9 | 100.9 | 100.9 | 101.2 | 100.6 |

Table 4 shows the melt stability data as measured by MVR shift and dwell rheology measurements for the different compositions. Except for Ex. 8, which has the highest loading of magnetite nanoparticles (10 phr) and shows melt degradation (i.e., an MVR shift of 31%), all other formulations are seen to be stable. Table 3 also shows the notched Izod impact data at 23° C., −10° C. and −30° C. for the formulations tested. All the examples, from 0.1 to 10 phr loading of nanoparticulate magnetite, show ductile fracture at all temperatures tested. The value of the impact strength reduces as the loading of magnetite is increased (825 J/m for 0.1 phr loading in Ex. 4, compared to 621 J/m for 10 phr loading in Ex. 8, measured at 23° C.); however, the ductility (ductile fracture mode) is maintained. This observation holds true even at −30° C. Finally, 60 degree gloss of these formulations was measured and all the values are high (>100 GU).

Figure 2:
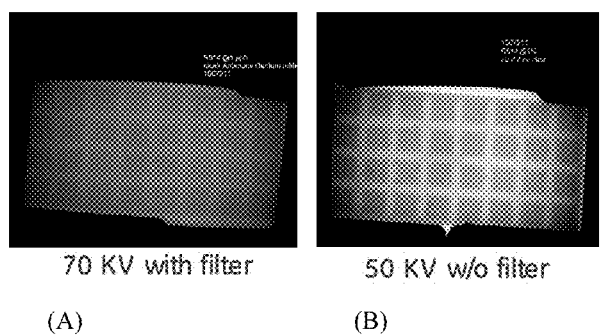
FIG. 2 is an X-ray image of a chocolate bar with pellets of an exemplary thermoplastic composition having X-ray contrast, scattered over the surface of the chocolate bar, taken at (A) 70 kV using a filter, and (B) 50 kV taken without a filter.

X-Ray Imaging. X-ray images to demonstrate enhanced contrast were obtained for pellets of a rutile titanate formulation (Ex. 3). Since a potential application is in the manufacture of chocolate molds, the contrast of pellets comprising the formulations against a bar of chocolate was measured. Samples were analyzed at 70 kV (FIG. 1, A; FIG. 2, A) using an Al filter to match the commercially used X-ray intensity, and at 50 kV (FIG. 1, B; FIG. 2, B) without a filter for added focus. FIG. 1 shows the contrast obtained with only a bar of chocolate in front of the detector under the two conditions. FIG. 2 shows the contrast obtained with pellets of the Pigment Yellow 53 (i.e., nickel-antimony titanate yellow pigment) composition of Ex. 3 sprinkled over the chocolate bar. The pellets are visible in FIG. 2; however, contrast can also potentially be improved by making adjustments to the X-ray hardware to refine beam focus and resolution, which is preferred to using increasing loading of titanates in the formulation.

Figure 3:
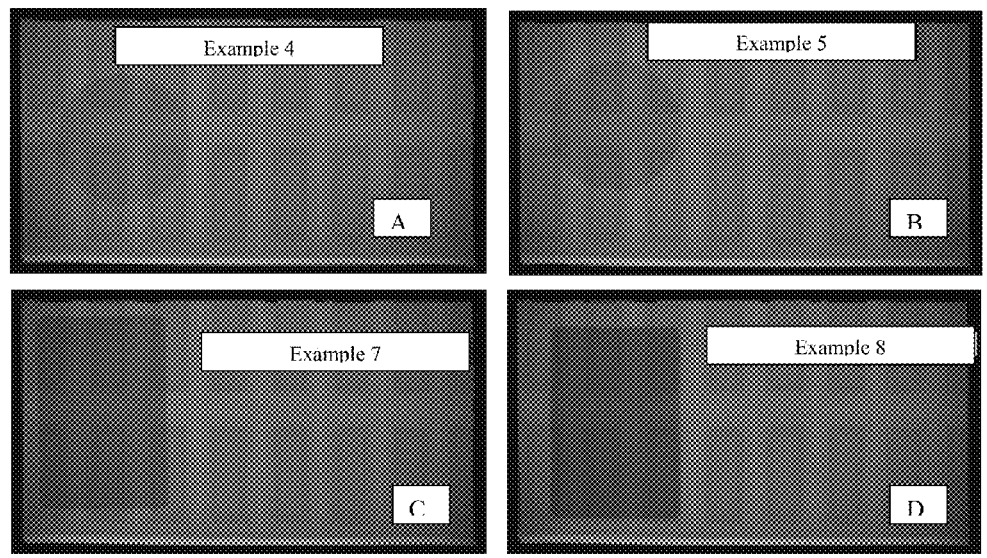
FIG. 3 shows X-ray images of a chocolate bar and an article (circular in A and B, oblong in C and D) placed on the chocolate bar, in which the articles are molded from the composition of (A) Example 4, (B) Example 5, (C) Example 7, and (D) Example 8.

FIG. 3 shows X-ray images of circular and rectangular molded plaques (3.2 mm thickness) of compounds of Exs. 4, 5, 7, and 8 (A, B, C, and D in FIG. 3, respectively) placed on a chocolate bar. Even at the lowest loading of 0.1 phr (Ex. 4; A in FIG. 3), the additive provides sufficient contrast to be detected against a chocolate bar. This X-ray contrast imaging may be converted into gray-scale units and a calibration curve can be built which could allow for detection of e.g., magnetite-containing contaminants, as discussed hereinbelow.

X-Ray Measurements. The X-ray contrast can also be quantified in terms of equivalent aluminum thickness, reported in units of thickness, i.e., in millimeters (mm) of Al. In this method, a series of aluminum discs of different known thicknesses are measured and a correlation is obtained between gray-scale or contrast and thickness of aluminum. The gray-scale from the sample of interest is then measured and the correlation is used to determine the equivalent aluminum thickness.

For the calibration curve of the method, 1100 grade aluminum standards at various known thicknesses were measured and an image of each standard was acquired. A histogram of the pixel gray-scale within a 1" (2.5 cm) sampling area and a histogram of a blank area (i.e., area with no sample) on the image were calculated. From each histogram, the mean and standard deviation of the pixel values were calculated and the ratio of the blank pixel value to the standard pixel area was correlated to the aluminum thickness. A calibration curve was thus assembled using the normalized pixel gray-scale value versus aluminum thickness. Analysis of samples was performed in the same manner as the calibration standards and the equivalent aluminum thickness was determined by correlation of the obtained gray-scale value (y axis) to the corresponding equivalent aluminum thickness (x axis). A 1.57 mm aluminum sample was used as a validation sample and the predictability was highly reproducible.

X-ray measurements were performed on 3.2 mm thick plaques using settings of 50 kV and 3 mA. The grayscale data for each sample was converted into equivalent aluminum thickness using a previously generated calibration curve correlating grayscale to thickness of aluminum discs as described above. The results are provided in Table 5.

TABLE 5

|  | Inorganic Compound | Inorganic Compound Loading (phr) | Equivalent Al thickness (mm Al) |
|---|---|---|---|
| Control[e] | None | — | 0.49 |
| CEx. 5 | Magnetite-1 | 5 | 0.62 |
| CEx. 12 | Pigment Green 50 | 2 | 0.46 |
| Ex. 1 | Pigment Yellow 53 | 1 | 0.48 |
| Ex. 2 | Pigment Brown 24 | 1 | 0.52 |
| Ex. 3 | Pigment Yellow 163 | 1 | 0.48 |
| Ex. 4 | Magnetite SMT-01S | 0.1 | 0.56 |
| Ex. 5 | Magnetite SMT-01S | 1 | 0.56 |
| Ex. 6 | Magnetite SMT-01S | 3 | 0.61 |
| Ex. 7 | Magnetite SMT-01S | 6 | 0.73 |
| Ex. 8 | Magnetite SMT-01S | 10 | 0.92 |

[e]PC-1

In Table 5, it can be seen that the lowest equivalent Al thickness of 0.46 mm is obtained in CEx. 12, with a loading of 2 phr of a spinel-based pigment (Pigment Green 50). The greatest contrast (highest Equivalent Al thickness) generally is obtained using the magnetites, which exhibit an Equivalent Al thickness of 0.56 mm even at loadings as low as 0.1 phr (Ex. 4, using magnetite particles of median particle size 0.2-0.5 micrometers). The highest contrast is obtained for Ex. 8, which includes magnetite SMT-01S at a loading of 10 phr. It is also noted that the larger particle size magnetite (CEx. 5, 5-25 micrometer median particle size) has about the same Equivalent Al thickness of 0.62 mm as does the smaller median particle size magnetite (Ex. 6, 0.2-0.5 micrometer median particle size) with an equivalent Al thickness of 0.61 mm at a loading of 3 phr. For comparison purposes, polycarbonate without filler or pigment has an equivalent Al thickness of 0.49 mm. It can be concluded from this data that the smaller particle sizes allow for the same X-ray contrast at a lower loading of the X-ray contrast agent than would be obtained for a larger particle size of the same X-ray contrast agent.

Release Measurements. Surface enrichment of the composition was also carried out. Table 6 shows the formulations studied for mold release properties. CEx. 13 is the control batch, which does not contain any additive, Ex. 9 contains a pigment whereas CEx. 14 contains magnetite having a median particle size of 10 micrometers. In addition to these batches, a standard 10 cc/10 min. melt flow (300° C., 1.2 kg of down force, 6 min. dwell) polycarbonate grade containing internal mold release (PC-3) was used as a control sample. PC-3 contains pentaerythritol tetrastearate (PETS) as mold release agent in an amount of about 0.27 phr.

TABLE 6

| Component | Control | CEx. 13[a] | Ex. 9[b] | CEx. 14[c] |
|---|---|---|---|---|
| PC-1 (phr) | — | 6 | 6 | 6 |
| PC-2 (phr) | — | 11 | 11 | 11 |
| PC-3[d] (phr) | 100 | — | — | — |
| PC-Si (phr) | — | 83 | 83 | 83 |
| I-168 (phr) | — | 0.06 | 0.06 | 0.06 |
| Pigment Yellow 53 (phr) | — | — | 1 | — |
| Magnetite-1 (phr) | — | — | — | 5 |
| Total (phr) | 100 | 100.06 | 101.06 | 105.06 |

[a]Duplicate of CEx. 1
[b]Duplicate of Ex. 1
[c]Duplicate of CEx. 5
[d]Contains pentaerythritol tetrastearate (PETS) as mold release agent at 0.27 phr per 100 parts of polycarbonate in the PC-3 composition.

Figure 4:
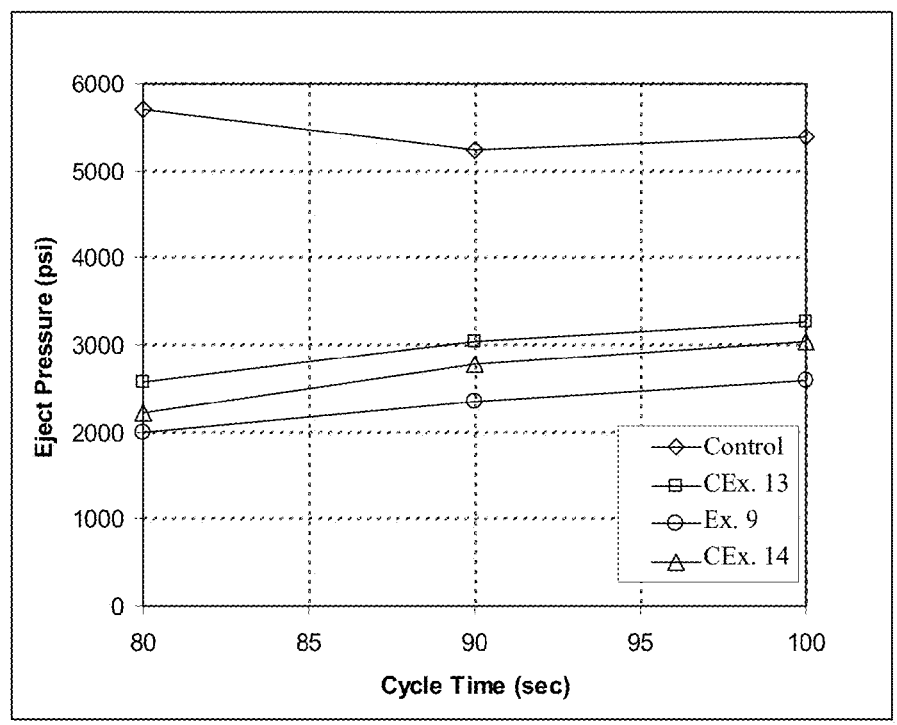
FIG. 4 shows a plot of ejection pressure versus cycle time to demonstrate mold release properties for articles molded from a polycarbonate control, Example 9, and Comparative Examples 13 and 14.

FIG. 4 shows the mold ejection pressure as a function of cycle time for

CEx. 13, Ex. 9, and CEx. 14 and the control polycarbonate sample. Three different cycle times, 80, 90 and 100 seconds, were studied. At each cycle time, the polysiloxane-polycarbonate copolymers show almost half the ejection pressure of the polycarbonate sample, thus showing the advantage of using these formulations. Ex. 9 and CEx. 14, which contain the X-ray detectable additive, also show consistently lower ejection pressures than the non-additive containing CEx. 13. It is believed that as a molded article cools (such as a chocolate mold immediately after being formed), the siloxane chains orient themselves such that the surface of an article molded from the polysiloxane-polycarbonate composition is enriched in siloxane. This phenomenon provides a number of advantages of the polysiloxane-polycarbonate containing composition over the polycarbonate composition without polysiloxane-polycarbonate present, chiefly (a) that it is easier release from the tool during processing for the polysiloxane-polycarbonate containing article, and (b) there is reduced part-to-part friction for the polysiloxane-polycarbonate containing article. Both these factors help to improve surface replication and provide a smooth, glossy surface. Since polysiloxane-polycarbonate copolymers are used in chocolate molds to retain the glossy appearance, it is necessary to ensure that the X-ray additive containing formulations will also show the same release properties.

Thus the above Examples and Comparative Examples demonstrate that X-ray detectable additives can enhance the properties of polysiloxane-polycarbonate copolymer-containing compositions without compromising properties such as mold release, melt flow, low temperature ductility, or gloss.

The second set of examples and the data were for metal detectable embodiments of the present invention. The components used are set forth below in Table 7 and the corresponding results are set forth in Tables 8 and 9 and FIGS. 5 and 6.

TABLE 7

| Materials used for metal detectable embodiments | | |
|---|---|---|
| Component | Description | Source |
| PC-Si-2 | LEXAN ™ EXL Polysiloxane-polycarbonate, 20 wt % dimethylsiloxane, average polysiloxane block length of 45 siloxane repeating units, Mw = 30,000 g/mol | SABIC Innovative Plastics |

TABLE 7-continued

Materials used for metal detectable embodiments

| Component | Description | Source |
|---|---|---|
| PC-Si-3 | LEXAN ™ EXL Polysiloxane-polycarbonate, 6 wt % dimethylsiloxane, average polysiloxane block length of 45 siloxane repeating units, Mw = 23,000 g/mol | SABIC Innovative Plastics |
| PC-4 | LEXAN ™ Bisphenol A (BPA) Polycarbonate Mw 30,500 g/mol | SABIC Innovative Plastics |
| PC-5 | LEXAN ™ Bisphenol A (BPA) Polycarbonate Mw 26,200 g/mol | SABIC Innovative Plastics |
| PC-6 | LEXAN ™ Bisphenol A (BPA) Polycarbonate Mw 21,800 g/mol | SABIC Innovative Plastics |
| I-168 | IRGAFOS ® 168 antioxidant (Tris-(2,6-di-tert-butylphenyl)phosphite) | Ciba Specialty Chemicals |
| Magnetite-2 | MAGNIF ® 10 functional filler with particle size $D_{10} = 6$ μm, $D_{50} = 18$ μm (median particle size), and $D_{90} = 41$ μm | Minelco, The Netherlands |
| SST | Stainless steel fiber with polycarbonate resin and sizing | Bekaert Fibre Technologies, Belgium |
| Magnetite SMT-01S | Magnetite, median particle size $D_{50} = 0.3$ μm | Saehan Media Co., Ltd., Korea |

Notched Izod impact (NII) testing was determined on 3.2 mm thick bars according to ASTM D256-04, at temperatures of 23° C., 0° C., −10° C., −20° C., and −30° C., where the NII impact strength is reported in units of joules per meter (J/m), and the percent ductility is defined as the percent of molded sample articles in a test set of at least 5 samples which exhibit ductile fracture mode.

Polycarbonate-polysiloxane formulations are known and used for their ductile fracture mode at low temperatures. All compositions were tested for Notched Izod impact using standard ASTM D256 parameters from temperatures ranging from 23° C. to −30° C. From Table 8, we see that the control formulations show ductile fracture at room temperature with an impact strength of 748 J/m (Cex. 15), 725 J/m (Cex. 23) and 836 J/m. It is beneficial that the metal detectable formulation also be able to retain this property. Table 8 shows Notched Izod impact data for the compositions made with metal detectable fillers. Addition of the filler reduces impact strength significantly at room temperature by half or even more for formulation based on solely polycarbonate (Cex. 16 to Cex. 22) and formulations based on polycarbonate-polysiloxane-2 (Cex. 24 to Cex. 30) with an overall siloxane level of 5 wt %.

Ductile impact is seen at room temperature only and in most cases, fracture mechanism changes to brittle mode, completely or partially depending on the filler at lower temperatures. Addition of the magnetite (fibers or powder) thus significantly reduced the impact strength, even at room temperature, depending on the filler loading as shown in the comparison.

For the polycarbonate formulations (Cex.16 to Cex.22) there is no formulation that shows ductile impact at 0° C. The average particle size of the fillers used ranged from 5-25 microns; hence effect on impact properties is severe.

Surprisingly it is shown that the combinations of polysiloxane modified PC and Fe3O4 (Ex 11 to Ex 17) are less sensitive for ductility decreases. It is even more surprisingly the these formulations have an overall siloxane level of 3.5%, lower then the overall siloxane level in Cex.24 to Cex. 30).

TABLE 8

| Component | | Cex-15 | Cex-16 | Cex-17 | Cex-18 | Cex-19 | Cex-20 | Cex-21 | Cex-22 | Cex-23 | Cex-24 | Cex-25 | Cex-26 |
|---|---|---|---|---|---|---|---|---|---|---|---|---|---|
| PC-4 | wt % | 30 | 30 | 30 | 30 | 30 | 30 | 30 | 30 | 11 | 11 | 11 | 11 |
| PC-5 | wt % | 70 | 70 | 70 | 70 | 70 | 70 | 70 | 70 | | | | |
| PC-6 | wt % | | | | | | | | | 6 | 6 | 6 | 6 |
| PC-Si-2 | wt % | | | | | | | | | | | | |
| PC-Si-3 | wt % | | | | | | | | | 83 | 83 | 83 | 83 |
| I-168 | wt % | 0.05 | 0.05 | 0.05 | 0.05 | 0.05 | 0.05 | 0.05 | 0.05 | 0.06 | 0.06 | 0.06 | 0.06 |
| SST | wt % | 0 | 1 | 2 | | | | | | 0 | 1 | 2 | |
| Magnetite-2 | wt % | | | | 1 | 2 | 4 | 6 | 8 | | | | 1 |
| Si content | (%) | 0 | 0 | 0 | 0 | 0 | 0 | 0 | 0 | 5 | 5 | 5 | 5 |
| NII (23° C.) | (J/m) | 748 | 144 | 105 | 160 | 118 | 105 | 97 | 82 | 725 | 462 | 314 | 389 |
| NII retention (23° C.) | (%) | 100 | 19 | 14 | 21 | 16 | 14 | 13 | 11 | 100 | 64 | 43 | 54 |
| Ductility | (%) | 100 | 0 | 0 | 0 | 0 | 0 | 0 | 0 | 100 | 100 | 100 | 100 |
| NII (0° C.) | (J/m) | 557 | 115 | 98 | 121 | 126 | 100 | 94 | 88 | 690 | 382 | 260 | 247 |
| NII retention (0° C.) | (%) | 100 | 21 | 18 | 22 | 23 | 18 | 17 | 16 | 100 | 55 | 38 | 36 |
| Ductility | (%) | 80 | 0 | 0 | 0 | 0 | 0 | 0 | 0 | 100 | 100 | 100 | 100 |

| Component | Cex-27 | Cex-28 | Cex-29 | Cex-30 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|
| PC-4 | 11 | 11 | 11 | 11 | 62.5 | 62.5 | 62.5 | 62.5 | 62.5 | 62.5 | 62.5 | 62.5 |
| PC-5 | | | | | 20 | 20 | 20 | 20 | 20 | 20 | 20 | 20 |

TABLE 8-continued

| | | | | | | | | | | | |
|---|---|---|---|---|---|---|---|---|---|---|---|
| PC-6 | 6 | 6 | 6 | 6 | | | | | | | |
| PC-Si-2 | | | | | 17.5 | 17.5 | 17.5 | 17.5 | 17.5 | 17.5 | 17.5 | 17.5 |
| PC-Si-3 | 83 | 83 | 83 | 83 | | | | | | | |
| I-168 | 0.06 | 0.06 | 0.06 | 0.06 | 0.03 | 0.03 | 0.03 | 0.03 | 0.03 | 0.03 | 0.03 | 0.03 |
| SST | | | | | 0 | 1 | 2 | | | | | |
| Magnetite-2 | 2 | 4 | 6 | 8 | | | | 1 | 2 | 4 | 6 | 8 |
| Si content | 5 | 5 | 5 | 5 | 3.5 | 3.5 | 3.5 | 3.5 | 3.5 | 3.5 | 3.5 | 3.5 |
| NII (23° C.) | 233 | 152 | 130 | 119 | 836 | 605 | 520 | 634 | 512 | 313 | 221 | 193 |
| NII retention (23° C.) | 32 | 21 | 18 | 16 | 100 | 72 | 62 | 76 | 61 | 37 | 26 | 23 |
| Ductility | 100 | 100 | 100 | 100 | 100 | 100 | 100 | 100 | 100 | 100 | 100 | 100 |
| NII (0° C.) | 148 | 119 | 110 | 102 | 769 | 507 | 381 | 449 | 291 | 185 | 148 | 146 |
| NII retention (0° C.) | 21 | 17 | 16 | 15 | 100 | 66 | 49 | 58 | 38 | 24 | 19 | 19 |
| Ductility | 0 | 0 | 0 | 0 | 100 | 100 | 100 | 100 | 100 | 80 | 0 | 0 |

As may be seen, decreasing the particle size of the inorganic additives can lead to better impact retention and other properties, while still maintaining the metal detectablility was also within acceptable limits for each of these examples (i.e., −20% to 0% or greater).

TABLE 9

| Component | | Cex-31 | Cex-32 | Cex-33 | Cex-34 | Ex. 18 | Ex. 19 | Ex. 20 | Ex. 21 |
|---|---|---|---|---|---|---|---|---|---|
| PC-4 | wt % | 30 | 30 | 30 | 30 | 62.5 | 62.5 | 62.5 | 62.5 |
| PC-5 | wt % | 70 | 70 | 70 | 70 | 20 | 20 | 20 | 20 |
| PC-6 | wt % | | | | | | | | |
| PC-Si-2 | wt % | | | | | 17.5 | 17.5 | 17.5 | 17.5 |
| PC-Si-3 | wt % | | | | | | | | |
| I-168 | wt % | 0.05 | 0.05 | 0.05 | 0.05 | 0.03 | 0.03 | 0.03 | 0.03 |
| Magnetite SMT-01S | wt % | 0 | 1 | 2 | 4 | 0 | 1 | 2 | 4 |
| Si content | (%) | 0 | 0 | 0 | 0 | 3.5 | 3.5 | 3.5 | 3.5 |
| NII (23° C.) | (J/m) | 748 | 734 | 742 | 611 | 836 | 819 | 811 | 824 |
| NII (0° C.) | (J/m) | 557 | 598 | 477 | 170 | 769 | 771 | 778 | 779 |
| NII (−20° C.) | (J/m) | 174 | 164 | 252 | 147 | 788 | 741 | 743 | 719 |

As may be seen in Table 9, the Notched izod data for compositions containing Magnetite SMT-01S is provided and it can be seen that the particle size of the magnetite may be adjusted to achieve selected characteristics. In these examples, smaller particle size magnetite was used. In those samples having both the polycarbonate and the polycarbonate-polysiloxane copolymer, the resulting impact strength was much greater than those samples having no polycarbonate-polysiloxane copolymer and these materials also had higher impact strengths than those corresponding samples using larger particle size magnetite (Ex. 13-15). So while larger particle size magnetite helped retain a greater impact strength than stainless steel fiber, if higher impact strength is a selected characteristic, then these examples would indicate that smaller particle size magnetite will help retain a higher percentage of NII than larger particle size magnetite.

Figure 5:
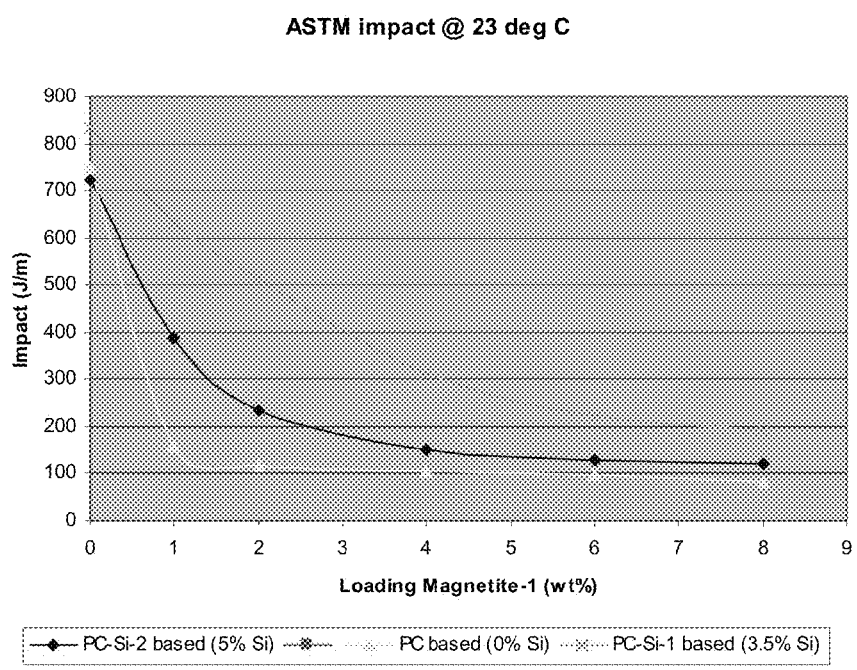
FIGS. 5 and 6 are graphs showing impact strength and impact retention of molded articles made according to the metal-detectable concepts of the present invention as compared to prior art compositions and showing 0, 3.5 and 5 total wt. % Si.
Figure 6:
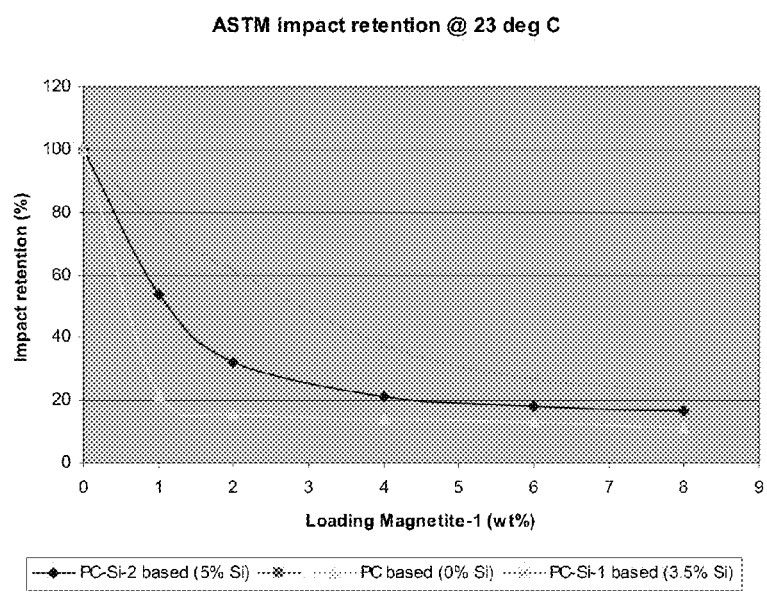
Figure 7:
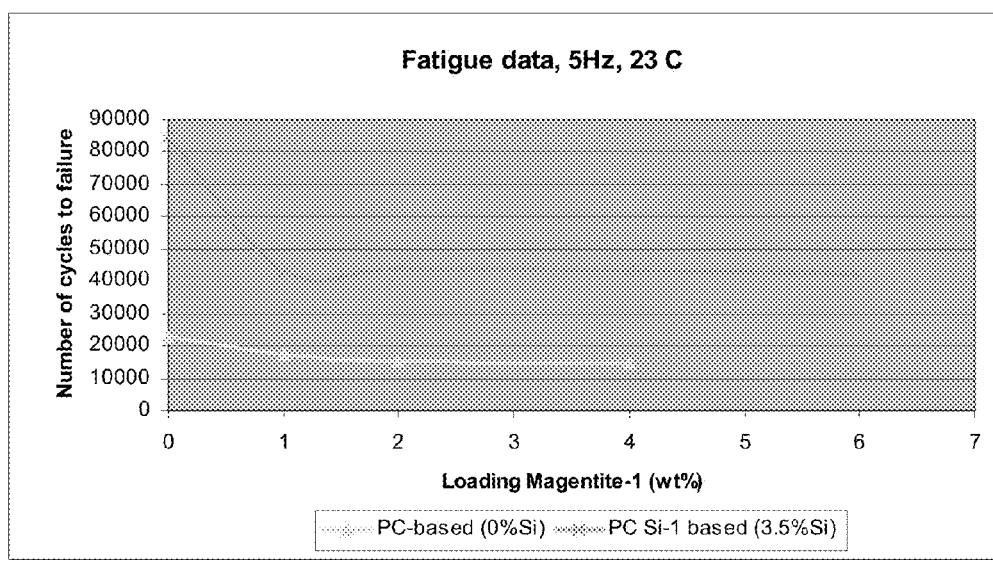
FIG. 7 is a graph showing fatigue data for metal detectable compositions of the present invention as compared to prior art compositions, again showing 0, 3.5 and 5 total wt. % Si.

FIGS. 5 and 6 also help show that polysiloxane based polycarbonate and Fe3O4 show good toughness, and toughness retention at low temperature. The data shown relates to 0, 3.5 and 5 total wt. % Si. In line with these results, as expected and shown in FIG. 7 and Table 10, fatigue (which is a beneficial property for chocolate molds) for PC Si-based system was significantly better compared to PC-based system (0% total wt. % Si) in the presence of magnetite.

TABLE 10

| | Sample no. | Stress, Mpa | No of cycles to failure | aver | std |
|---|---|---|---|---|---|
| PC-4 | 1 | 30 | 19171 | 22703.5 | 4995.709 |
| | 2 | 30 | 26236 | | |
| PC-4 + 1% | 1 | 30 | 18795 | 17308.5 | 2102.228 |

TABLE 10-continued

| | Sample no. | Stress, Mpa | No of cycles to failure | aver | std |
|---|---|---|---|---|---|
| Magnetite-2 | 2 | 30 | 15822 | | |
| PC-4 + 2% | 1 | 30 | 16112 | 15127 | 1393 |
| Magnetite-2 | 2 | 30 | 14142 | | |
| PC-4 + 4% | 1 | 30 | 13308 | 14483 | 1661.701 |
| Magnetite-2 | 2 | 30 | 15658 | | |
| PC-Si-2 | 1 | 30 | 85544 | 84379.5 | 1646.852 |
| | 2 | 30 | 83215 | | |
| PC-Si-2 + 1% | 1 | 30 | 43445 | 42738 | 999.849 |
| Magnetite-2 | 2 | 30 | 42031 | | |
| PC-Si-2 + 2% | 1 | 30 | 44891 | 44108 | 1107.329 |
| Magnetite-2 | 2 | 30 | 43325 | | |
| PC-Si-2 + 4% | 1 | 30 | 46537 | 43638 | 4099.805 |
| Magnetite-2 | 2 | 30 | 40739 | | |
| PC-Si-2 + 6% | 1 | 30 | 41818 | 42436.5 | 874.6911 |
| Magnetite-2 | 2 | 30 | 43055 | | |

Thus the above Examples and Comparative Examples demonstrate that metal detectable additives can also enhance the properties of polysiloxane-polycarbonate copolymer-containing compositions without compromising properties such as mold release, melt flow, low temperature ductility, or gloss.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

We claim:

1. An article comprising a thermoplastic composition comprising:
   a) 5 to 100 parts by weight polysiloxane-polycarbonate,
   b) 0 to 95 parts by weight polycarbonate, based on combined 100 parts by weight of polysiloxane-polycarbonate and polycarbonate, and
   c) 0.01 to 10 parts by weight, based on a combined 100 parts by weight of polysiloxane-polycarbonate and polycarbonate, of an X-ray contrast agent comprising X-ray scattering atoms having an atomic number of greater than or equal to 22,
   wherein the thermoplastic composition has a siloxane content of 1 to 4 wt %, based on the total weight of the thermoplastic composition,
   wherein an article molded from the thermoplastic composition and having a thickness of 3.2 mm has a notched Izod impact (NII) strength of greater than or equal to about 620J/m, when measured at a temperature of 0° C. according to ASTM D256-04, or a notched Izod impact strength of greater than or equal to about 409 J/m, when measured at a temperature of −30° C. according to ASTM D256-04,
   wherein an article molded from the thermoplastic composition and having a thickness of 3.2 mm has an Equivalent Al Thickness of greater than 0.51 mm, when irradiated with 50 kV X-ray radiation, and
   wherein for melt volume rates of the thermoplastic composition determined under a load of 1.2 kg at a temperature of 300° C. according to ASTM D123 8-04, a melt volume rate measured at a dwell time of 18 minutes increases relative to a melt volume rate measured at a dwell time of 6 minutes by less than or equal to 31%,
   wherein the X-ray contrast agent has a median particle size of greater than 0.1micrometers to 5 micrometers.

2. The article of claim 1, wherein the X-ray contrast agent has a median particle size of 0.2 to 0.5 micrometers.

3. The article of claim 1, wherein the polycarbonate is present in an amount of 1 to 95 parts by weight, based on combined 100 parts by weight of polysiloxane-polycarbonate and polycarbonate.

4. The article of claim 1, wherein the siloxane content is 1 to 3.5 wt %, based on the total weight of the thermoplastic composition.

5. The article of claim 1, wherein the thermoplastic composition comprises a metal detectable agent and wherein the metal detectable agent comprises magnetite.

6. The article of claim 5, wherein the metal detectable agent is different from the X-ray contrast agent.

7. The article of claim 1, wherein the polysiloxane-polycarbonate comprises 50 to 99.9 wt % of carbonate units and 0.1 to 50 wt % siloxane units, based on the total weight of the polysiloxane-polycarbonate.

8. The article of claim 1, comprising polysiloxane-polycarbonate in an amount of 50 to 99 parts by weight, and polycarbonate in an amount of 1 to 50 parts by weight based on a combined 100 parts by weight of polysiloxane-polycarbonate and polycarbonate.

9. The article of claim 8, wherein the polysiloxane-polycarbonate comprises 90 to 99 wt % of carbonate units and 1 to 10 wt % siloxane units, based on the total weight of the polysiloxane-polycarbonate.

10. The article of claim 1, wherein the thermoplastic composition comprises polysiloxane-polycarbonate in an amount of 5 to 30 parts by weight, and polycarbonate in an amount of 70 to 95 parts by weight based on a combined 100parts by weight of polysiloxane-polycarbonate and polycarbonate.

11. The article of claim 10, wherein the polysiloxane-polycarbonate comprises 75 to 85 wt % of carbonate units and 15 to 25 wt % siloxane units, based on the total weight of the polysiloxane-polycarbonate.

12. The article of claim 1, wherein the X-ray contrast agent comprises X-ray scattering atoms having an atomic number of greater than or equal to 24.

13. The article of claim 1, wherein the X-ray contrast agent comprises X-ray scattering atoms in an amount greater than or equal to about 1 percent by weight, based on the total weight of the X-ray contrast agent.

14. The article of claim 1, wherein the X-ray contrast agent comprises magnetite or rutile titanate.

15. The article of claim 14, wherein the X-ray contrast agent comprises the magnetite and wherein the median particle size of the magnetite is less than about 1 micrometer.

16. The article of claim 14, wherein the X-ray contrast agent comprises the rutile titanate and wherein the rutile titanate comprises Pigment Yellow 53, Pigment Yellow 163, Pigment Brown 24, or a combination comprising at least one of the foregoing.

17. The article of claim 1, wherein for melt volume rates of the composition determined under a load of 1.2 kg at a temperature of 300° C. according to ASTM D1238-04, a melt volume rate measured at a dwell time of 18 minutes differs from a melt volume rate measured at a dwell time of 6 minutes by less than or equal to 20%.

18. The article of claim 1, wherein the thermoplastic composition further comprises additives including impact modifiers, fillers, antioxidants, heat stabilizers, light, stabilizers, UV light stabilizers, plasticizers, lubricants, mold release agents, flame retardants, antistatic agents, anti-drip agents, radiation stabilizers, or a combination comprising at least one of the foregoing additives.

19. The article of claim 1, wherein an article molded from the thermoplastic composition and having a thickness of 3.2 mm has an Equivalent Al Thickness of greater than 0.55 mm, when irradiated with 50 kV X-ray radiation.

20. The article of claim 1, comprising a surface gloss, measured at an angle of 60 degrees on 3 mm colored chips, of greater than or equal to 90 gloss units, according to ASTM D2457.

21. A thermoplastic composition comprising:
a) 5 to 100 parts by weight of a polysiloxane-polycarbonate,
b) 0 to 95 parts by weight of a polycarbonate, and
c) 0.01 to 10 parts by weight of an X-ray contrast agent comprising rutile titanate having a median particle size of greater than 0.1 micrometers to less than or equal to about 5 micrometers, magnetite having a median particle size of less than about 1 micrometer, or a combination comprising at least one of the foregoing contrast agents,
wherein the thermoplastic composition has a siloxane content of 1 to 4 wt %, based on the total weight of the thermoplastic composition,
wherein each of the polysiloxane-polycarbonate, polycarbonate, and X-ray contrast agent are present based on a combined 100 parts by weight of polysiloxane-polycarbonate and polycarbonate,
wherein an article molded from the thermoplastic composition and having a thickness of 3.2 mm has a notched Izod impact (NII) strength of greater than or equal to about 620J/m, when measured at a temperature of 0° C. according to ASTM D256-04, or a notched Izod impact strength of greater than or equal to about 409 J/m, when measured at a temperature of −30° C. according to ASTM D256-04,
wherein an article molded from the thermoplastic composition and having a thickness of 3.2 mm has an Equivalent Al Thickness of greater than 0.51 mm, when irradiated with 50 kV X-ray radiation, and
wherein for melt volume rates of the thermoplastic composition determined under a load of 1.2 kg at a temperature of 300° C. according to ASTM D123 8-04, a melt volume rate measured at a dwell time of 18 minutes increases relative to a melt volume rate measured at a dwell time of 6 minutes by less than or equal to 31%.

22. The thermoplastic composition of claim 21, wherein the polysiloxane-polycarbonate has an average block length D for a polysiloxane unit of the polysiloxane-polycarbonate of about 5 to about 50 siloxane units.

23. The thermoplastic composition of claim 21, comprising 1 to 10 parts by weight of rutile titanate.

24. A thermoplastic composition comprising:
a) 5 to 100 parts by weight polysiloxane-polycarbonate,
b) 0 to 95 parts by weight polycarbonate, based on combined 100 parts by weight of polysiloxane-polycarbonate and polycarbonate, and
c) 0.01 to 10 parts by weight, based on a combined 100 parts by weight of polysiloxane-polycarbonate and polycarbonate, of an X-ray contrast agent comprising X-ray scattering atoms having an atomic number of greater than or equal to 22,
wherein the thermoplastic composition has a siloxane content of 1 to 4 wt %, based on the total weight of the thermoplastic composition,
wherein an article molded from the thermoplastic composition and having a thickness of 3.2 mm has a notched Izod impact (NII) strength of greater than or equal to about 620J/m, when measured at a temperature of 0° C. according to ASTM D256-04, or a notched Izod impact strength of greater than or equal to about 409 J/m, when measured at a temperature of −30° C. according to ASTM D256-04,
wherein an article molded from the thermoplastic composition and having a thickness of 3.2 mm has an Equivalent Al Thickness of greater than 0.51 mm, when irradiated with 50 kV X-ray radiation, and
wherein for melt volume rates of the thermoplastic composition determined under a load of 1.2 kg at a temperature of 300° C. according to ASTM D123 8-04, a melt volume rate measured at a dwell time of 18 minutes increases relative to a melt volume rate measured at a dwell time of 6 minutes by less than or equal to 31%, and
wherein the X-ray contrast agent has a median particle size of greater than 0.1 micrometers to 5 micrometers.

25. A method for increasing the X-ray contrast in an article comprising
a thermoplastic composition which comprises: a) 5 to 100 parts by weight polysiloxane-polycarbonate, b) 0 to 95 parts by weight polycarbonate, based on combined 100 parts by weight of polysiloxane-polycarbonate and polycarbonate, and c) 0.01 to 10 parts by weight, based on a combined 100 parts by weight of polysiloxane-polycarbonate and polycarbonate, of an X-ray contrast agent,
wherein the X-ray contrast agent comprises an element having an atomic number of greater than or equal to 22, and
forming the article from the thermoplastic composition,
wherein the thermoplastic composition has a siloxane content of 1 to 4 wt %, based on the total weight of the thermoplastic composition,
wherein an article molded from the thermoplastic composition and having a thickness of 3.2 mm has a notched Izod impact (NII) strength of greater than or equal to about 620J/m, when measured at a temperature of 0° C. according to ASTM D256-04, or notched Izod impact strength of greater than or equal to about 409 J/m, when measured at a temperature of −30° C. according to ASTM D256-04,
wherein an article molded from the thermoplastic composition and having a thickness of 3.2 mm has an Equivalent Al Thickness of greater than 0.51 mm, when irradiated with 50 kV X-ray radiation, and
wherein for melt volume rates of the thermoplastic composition determined under a load of 1.2 kg at a temperature of 300° C. according to ASTM D123 8-04, a melt volume rate measured at a dwell time of 18 minutes increases relative to a melt volume rate measured at a dwell time of 6 minutes by less than or equal to 31%; and
wherein the X-ray contrast agent has a median particle size of greater than 0.1 micrometers to 5 micrometers.

* * * * *